US012748466B2

(12) United States Patent
Liu

(10) Patent No.: US 12,748,466 B2
(45) Date of Patent: Sep. 29, 2026

(54) FOLDING MECHANISM AND FOLDABLE ELECTRONIC DEVICE

(71) Applicant: Beijing Xiaomi Mobile Software Co., Ltd., Beijing (CN)

(72) Inventor: Jianwei Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 19 days.

(21) Appl. No.: 18/867,044

(22) PCT Filed: May 19, 2022

(86) PCT No.: PCT/CN2022/093925
§ 371 (c)(1),
(2) Date: Nov. 19, 2024

(87) PCT Pub. No.: WO2023/221049
PCT Pub. Date: Nov. 23, 2023

(65) Prior Publication Data
US 2025/0306645 A1 Oct. 2, 2025

(51) Int. Cl.
*G06F 1/16* (2006.01)

(52) U.S. Cl.
CPC .......... *G06F 1/1681* (2013.01); *G06F 1/1652* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,429,896 | B2 * | 10/2019 | Kuramochi | G06F 1/1681 |
| 10,520,992 | B1 * | 12/2019 | Chang | H05K 5/0226 |
| 11,068,032 | B2 * | 7/2021 | Huang | H04M 1/022 |
| 11,353,931 | B2 * | 6/2022 | Hsu | E05D 1/04 |
| 11,522,985 | B1 * | 12/2022 | Lim | H04M 1/022 |
| 11,567,544 | B2 * | 1/2023 | Liu | H04M 1/0216 |

(Continued)

FOREIGN PATENT DOCUMENTS

| | | |
|---|---|---|
| CN | 111692196 A | 9/2020 |
| CN | 111698355 A | 9/2020 |

(Continued)

OTHER PUBLICATIONS

ISA State Intellectual Property Office of the People's Republic of China, International Search Report issued in Application No. PCT/CN2022/093925, Dec. 15, 2022, WIPO, 4 pages.

(Continued)

*Primary Examiner* — Lisa Lea-Edmonds
(74) *Attorney, Agent, or Firm* — Finnegan, Henderson, Farabow, Garrett & Dunner, L.L.P.

(57) ABSTRACT

A folding mechanism includes: a base frame assembly and a supporting assembly; and a linkage member including a first linkage assembly and a second linkage assembly, wherein the first linkage assembly is rotatably connected with the base frame assembly; the first linkage assembly is rotatably connected with the supporting assembly; the second linkage assembly is rotatably connected with the base frame assembly; the second linkage assembly is slidably connected with the supporting assembly; and the first linkage assembly and the second linkage assembly are rotatably connected.

20 Claims, 10 Drawing Sheets

(56) References Cited

U.S. PATENT DOCUMENTS

| | | | | |
|---|---|---|---|---|
| 11,729,929 | B2 * | 8/2023 | Zhang | G09F 9/301 361/807 |
| 11,909,899 | B2 * | 2/2024 | Lim | H04M 1/022 |
| 11,937,391 | B2 * | 3/2024 | Gong | H04M 1/0268 |
| 11,994,161 | B2 * | 5/2024 | Liu | H04M 1/022 |
| 12,150,261 | B2 * | 11/2024 | Liu | H05K 5/0226 |
| 12,274,014 | B2 * | 4/2025 | Li | H05K 5/0226 |
| 12,379,749 | B2 * | 8/2025 | Liu | G06F 1/1681 |
| 2020/0326751 | A1 * | 10/2020 | Kim | G06F 1/1616 |
| 2020/0326757 | A1 * | 10/2020 | Huang | H04M 1/022 |
| 2020/0409427 | A1 * | 12/2020 | Hsu | G06F 1/1681 |
| 2021/0181808 | A1 | 6/2021 | Liao et al. | |
| 2021/0311531 | A1 * | 10/2021 | Huang | G06F 1/1652 |
| 2022/0124923 | A1 * | 4/2022 | Zhang | H05K 5/0217 |
| 2022/0174830 | A1 * | 6/2022 | Li | H04M 1/022 |
| 2023/0279898 | A1 * | 9/2023 | Liu | H05K 5/0226 361/807 |
| 2023/0315161 | A1 * | 10/2023 | Liu | H04M 1/022 361/191 |
| 2023/0320006 | A1 * | 10/2023 | Gong | H04M 1/022 361/807 |
| 2025/0151217 | A1 * | 5/2025 | Li | H05K 5/0226 |
| 2025/0306645 | A1 * | 10/2025 | Liu | G06F 1/1616 |

FOREIGN PATENT DOCUMENTS

| | | | |
|---|---|---|---|
| CN | 112087540 | A | 12/2020 |
| CN | 112333308 | A | 2/2021 |
| CN | 112995368 | A | 6/2021 |
| CN | 113014696 | A | 6/2021 |
| CN | 113067923 | A | 7/2021 |
| CN | 113067925 | A | 7/2021 |
| CN | 113404766 | A | 9/2021 |
| CN | 113795683 | A | 12/2021 |
| CN | 114076144 | A | 2/2022 |
| CN | 114245625 | A | 3/2022 |
| CN | 114333566 | A | 4/2022 |
| CN | 114449067 | A | 5/2022 |
| TW | 201921222 | A | 6/2019 |

OTHER PUBLICATIONS

Extended European Search Report Issued in Application No. 22942089.8 dated Jun. 13, 2025, 8 pages.

ISA State Intellectual Property Office of the People's Republic of China, Written Opinion of the International Searching Authority Issued in Application No. PCT/CN2021/093925, Dec. 15, 2022, WIPO, 6 pages.

State Intellectual Property Office of the People's Republic of China, Office Action and Search Report Issued in Application No. 2022800017109, Jun. 26, 2026, 12 pages.

State Intellectual Property Office of the People's Republic of China, Office Action and Search Report Issued in Application No. 2023110249895, Jul. 31, 2026, 12 pages.

* cited by examiner

FOLDING MECHANISM AND FOLDABLE ELECTRONIC DEVICE

CROSS-REFERENCE TO RELATED APPLICATIONS

The present application is a US national phase of International patent application No. PCT/CN2022/093925 filed on May 19, 2022, the content of which is incorporated here in its entirety by reference.

TECHNICAL FIELD

The present disclosure relates to the field of electronic technologies, and in particular, to a folding mechanism and a foldable electronic device.

BACKGROUND ART

Electronic devices such as mobile phones and tablet computers have become indispensable technical products in people's life, learning and entertainment. At present, foldable electronic devices using a flexible display screen use a mechanical folding mechanism to fold the flexible display screen, so as to ensure that no fault occurs in normal use process of the flexible display screen, and thus not affecting the normal bending of the flexible display screen. When the flexible display screen of the foldable electronic device is folded, the foldable electronic device can be conveniently carried, and the flexible display screen has a larger display area after being unfolded, thereby being more and more favored by consumers.

In the related art of foldable electronic devices, a folding mechanism is usually used to realize unfolding or folding of the flexible display screen. However, traditional folding mechanism is complex in structure and high in cost.

SUMMARY

The present disclosure provides a folding mechanism and a foldable electronic device. The folding mechanism uses the linkage to drive supporting assembly to realize folding and unfolding. The structure is simple and reliable, and the manufacturing cost of the foldable electronic device is reduced.

The technical solution is as follows:

According to a first aspect of embodiments of the present disclosure, a folding mechanism is provided, including a base frame assembly, a supporting assembly and linkage member. The linkage member includes a first linkage assembly and a second linkage assembly. The first linkage assembly is rotatably connected with the base frame assembly, and the first linkage assembly is rotatably connected with the supporting assembly. The first linkage assembly and the second linkage assembly are rotatably connected. The second linkage assembly is rotatably connected with the base frame assembly, and the second linkage assembly is slidably connected with the supporting assembly.

The technical solutions provided by the embodiments of the present disclosure may include the following beneficial effects:

The first linkage assembly is rotatably connected with the base frame assembly, and the first linkage assembly is rotatably connected with the supporting assembly. The first linkage assembly and the second linkage assembly are rotatably connected. The second linkage assembly is rotatably connected with the base frame assembly, and the second linkage assembly is slidably connected with the supporting assembly. Further, when the first linkage assembly and the second linkage assembly rotate about the base frame assembly, the supporting assembly can be driven to rotate through the first linkage assembly, so that the supporting assembly slides with respect to the second linkage assembly, at least part of the supporting assembly can be switched between the supporting state and the avoiding state. The folding mechanism uses the linkage to drive the supporting assembly to realize folding and unfolding. The structure is simple and reliable, and the manufacturing cost of the foldable electronic device is reduced.

According to a second aspect of the embodiments of the present disclosure, there is further provided a foldable electronic device, including a flexible display screen and the above folding mechanism. The linkage member and the supporting assembly are respectively provided in at least two sets, and the at least two sets of linkage members and the at least two sets of supporting assemblies are respectively arranged on two sides of the base frame assembly in a one-to-one correspondence. At least part of the flexible display screen covers the two sets of supporting assemblies.

The technical solutions provided by the embodiments of the present disclosure may include the following beneficial effects:

When the foldable electronic device is switched from the folded state to the open state, the linkage assemblies on the two sides of the base frame assembly rotate around the base frame assembly. As the first linkage assembly and the second linkage assembly rotate about the base frame assembly, the supporting assembly can be driven to rotate through the first linkage assembly, so that the supporting assembly sides relative to the second linkage assembly, at least part of the supporting assembly stretches towards the supporting state, and thus the flexible display screen arranged on the two sets of supporting assemblies are unfolded towards the opening state. When the foldable electronic device is switched from the open state to the folded state, the linkage assemblies on the two sides of the base frame assembly rotate around the base frame assembly. As the first linkage assembly and the second linkage assembly rotate about the base frame assembly, the supporting assembly can be driven to rotate through the first linkage assembly, so that the supporting assembly slides relative to the second linkage assembly, and the supporting assembly at least partially rotates towards the avoiding state, and thus the flexible display screen arranged on the two sets of supporting assemblies are also folded towards the folded state.

It should be understood that the above general description and following detailed description are exemplary and explanatory only and are not intended to limit the present disclosure.

BRIEF DESCRIPTION OF DRAWINGS

The accompanying drawings, which form a part of the present disclosure, serve to provide a further understanding of the present disclosure, and the example embodiments of the present disclosure and the description thereof are used to explain the present disclosure, and do not constitute an improper limitation to the present disclosure.

DESCRIPTION OF REFERENCE NUMERALS

Figure 1:
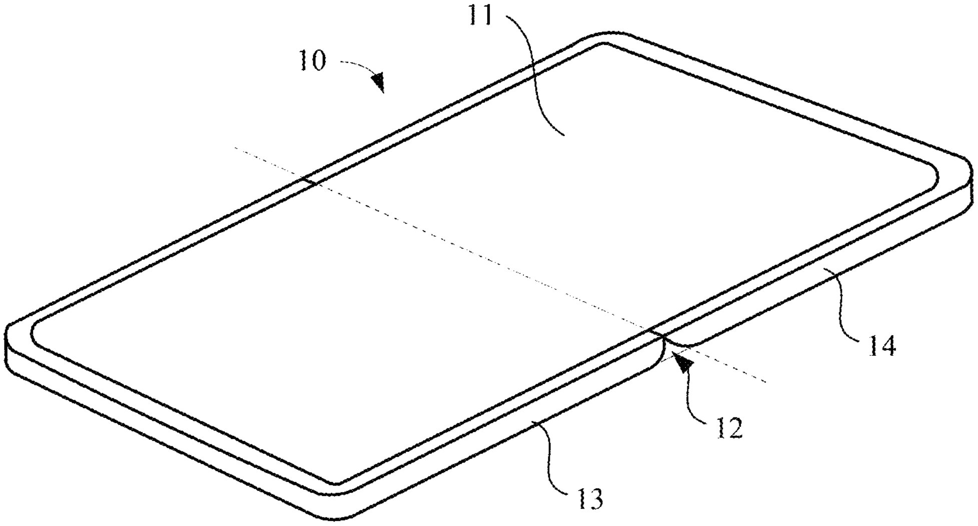
FIG. 1 is a schematic structural diagram of a foldable electronic device shown according to an embodiment (the flexible display screen is in an unfolded state).
Figure 2:
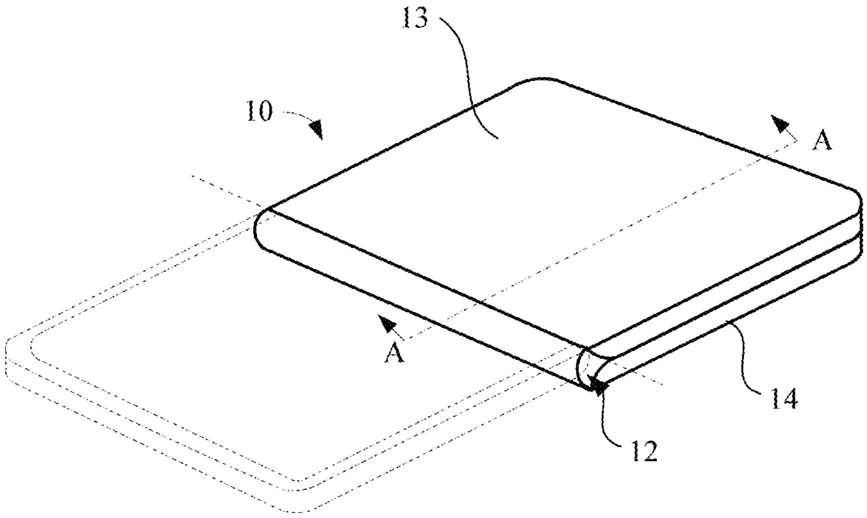
FIG. 2 is a schematic diagram of the foldable electronic device shown in FIG. 1 in a folded state.

10: foldable electronic device; 11: flexible display screen; 12: folding mechanism; 13: first housing; 14: second housing; 100: base frame assembly; 110: first arc-shaped groove; 120: supporting plate; 121: first supporting surface; 130: cover plate; 131: first groove; 200: linkage member; 210: first linkage assembly; 210*a*: second supporting surface; 211: transmission member; 2111: first rotating portion; 201: first through hole; 2112: second rotating portion; 212: first rotating member; 2121: first guiding portion; 2122: first hinge portion; 202: first rotating body; 203: first gap; 204: second through hole; 213: second rotating member; 2131: abutting surface; 2132: second hinge portion; 205: second rotating body; 206: second gap; 207: third through hole; 2133: third hinge portion; 208: third rotating body; 209: third gap; 2010: fourth through hole; 214: first rotating shaft; 215: second rotating shaft; 220: second linkage assembly; 221: third rotating member; 2211: third rotating portion; 2001: first rotating hole; 2212: second guiding portion; 2002: guiding body; 2213: fourth rotating portion; 2214: accommodating recess; 2215: support body; 2216: arc-shaped body; 222: third rotating shaft; 223: fourth rotating shaft; 224: mating portion; 2241: bearing surface; 2242: second groove; 300: supporting assembly; 310: moving member; 301: sliding groove; 311: mounting body; 3111: rotating groove; 312: fourth gap; 313: first arc-shaped guiding portion; 304: second arc-shaped groove; 314: avoiding surface; 320: supporting member; 302: third supporting surface; 303: accommodating space; 321: second arc-shaped guiding portion; 305: second arc-shaped body; 400: synchronizing assembly; 410: first gear; 420: second gear; 500: damping assembly; 510: mounting member; 520: elastic member; 530: rotation stopping member; 531: pressing protrusion; 540: damping ring; 550: damping member; 501: mating slot; 551: first mating segment; 552; second mating segment; 553: third mating segment; 554; first protrusion; 555; second protrusion; 502: relief hole.

DETAILED DESCRIPTION

To make the objectives, technical solutions and advantages of the present disclosure clearer, the present disclosure will be further described in detail below with reference to the accompanying drawings and specific embodiments. It should be understood that the specific embodiments described herein are merely used to explain the present disclosure, and do not limit the protection scope of the present disclosure.

Unless otherwise defined, all technical and scientific terms used herein are the same as commonly understood by those skilled in the art of this disclosure. The terminology used herein in the specification of the present disclosure is for the purpose of describing particular embodiments only and is not intended to limit the present disclosure.

Electronic devices such as mobile phones and tablet computers have become indispensable technical products in people's life, learning and entertainment, bringing convenience and fun to people's lives. With the diversification of functions of electronic devices, electronic devices comes with numerous types and brands, offering consumers a lot of options, consequently, merely improving functional characteristics of electronic devices cannot meet requirements of people on electronic devices, and aesthetics of the structure of electronic devices also become an important factor affecting the competitiveness of electronic products. In electronic devices with similar functions or performances, the more beautiful the appearance of the electronic device is, the more attractive it is to the consumers.

With increasing maturity of application of flexible display screens, the flexible display screens are more and more widely used in electronic devices. For the foldable electronic device incorporating a flexible display screen, the flexible display screen can be folded to be convenient to carry; and the flexible display screen has a larger display area after being unfolded, so that such foldable electronic device is increasingly favored by consumers.

However, in the related art, a mechanical folding mechanism needs to be used for folding the flexible display screen, so as to ensure that no failure occurs in the normal use process of the flexible display screen, and the normal bending of the flexible display screen is not affected. Meanwhile, the folding mechanism cannot damage the flexible display screen and cannot affect the shape of the whole electronic device. That is, on the premise that screen quality, screen service life and overall product deformation are not affected, a complicated folding mechanism is needed to assist the flexible display screen in realizing unfolding and folding functions, which leads to a high cost of the traditional foldable electronic device and is not conducive to popularization.

In term of this, the present disclosure provides a folding mechanism, which uses the linkage to move away to bring supporting assembly to move so as to realize folding and unfolding. The structure is simple and reliable which help reduce the manufacturing cost of the foldable electronic device.

To better understand the folding mechanism of the present disclosure, a foldable electronic device utilizing the folding mechanism is described.

As shown in FIG. 1 to FIG. 4, a foldable electronic device 10 includes a flexible display screen 11 and the above-mentioned folding mechanism 12. The folding mechanism 12 includes a base frame assembly 100, a linkage member 200, and a supporting assembly 300. The linkage member 200 includes a first linkage assembly 210 and a second linkage assembly 220. The first linkage assembly 210 is rotatably connected with the base frame assembly 100, and the first linkage assembly 210 is rotatably connected with the supporting assembly 300. The first linkage assembly 210 and the second linkage assembly 220 are rotatably connected. The second linkage assembly 220 is rotatably connected with the base frame assembly 100, and the second linkage assembly 220 is slidably connected with the supporting assembly 300. At least two sets of linkage members 200 and at least two sets of supporting assemblies 300 are respectively provided, and are respectively disposed on two sides of the base frame assembly 100 in a one-to-one correspondence. At least part of the flexible display screen 11 covers the at least two sets of supporting assemblies 300.

When the foldable electronic device 10 is switched from a folded state to an unfolded state, the linkage assemblies on both sides of the base frame assembly 100 rotate around the base frame assembly 100. As the first linkage assemblies 210 and the second linkage assemblies 220 rotate about the base frame assembly 100, the supporting assemblies 300 can be brought to rotate by the first linkage assemblies 210, so that the supporting assemblies 300 slide with respect to the second linkage assemblies 220, and at least part of the supporting assemblies 300 is stretched towards a supporting state, and thus the flexible display screen 11 arranged to cover the two sets of supporting assemblies 300 is also unfolded to the unfolded state. When the foldable electronic device 10 is switched from the unfolded state to the folded state, the linkage assemblies on both sides of the base frame assembly 100 rotate around the base frame assembly 100. As the first linkage assemblies 210 and the second linkage assemblies 220 rotate about the base frame assembly 100, the supporting assemblies 300 can be brought to rotate by the first linkage assemblies 210, so that the supporting assemblies 300 slide with respect to the second linkage assemblies 220, and at least part of the supporting assemblies 300 rotates to an avoiding state, and thus the flexible display screen 11 arranged to cover the two sets of supporting assemblies 300 is also folded to the folded state.

Figure 3:
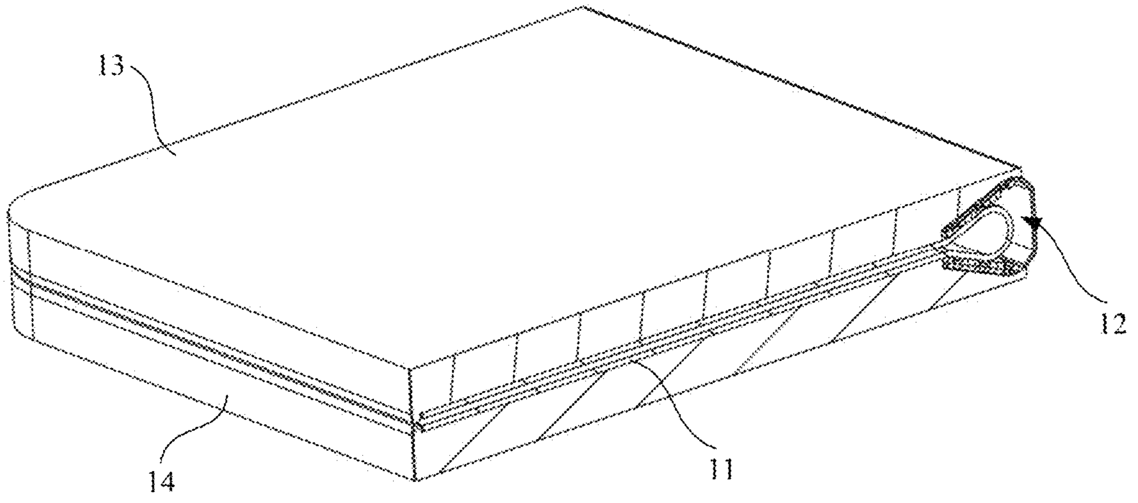
FIG. 3 is a cross-sectional view of the foldable electronic device shown in FIG. 2 taken along line A-A.

As shown in FIG. 3, in some embodiments, the foldable electronic device 10 further includes a first housing 13 and a second housing 14 rotatably connected to the base frame assembly 100. The flexible display screen 11 covers the first housing 13 and the second housing 14 to form protective space, and at least part of the folding mechanism 12 is disposed in the protective space. Two sets of the linkage members 200 and two sets of the supporting assemblies 300 are respectively provided, and are respectively disposed on two sides of the base frame assembly 100 in a one-to-one correspondence. When the first housing 13 and the second housing 14 are in the unfolded state, parts of the two supporting assemblies 300 are configured to support the flexible display screen 11, so that the flexible display screen 11 is in the unfolded state. When the first housing 13 and the second housing 14 are in the folded state and the flexible display screen 11 is in a folded state, at least part of the two supporting assemblies 300 are disposed opposite to each other and form accommodating space 303. Part of the flexible display screen 11 may be bent in the accommodating space 303, which may reduce bending stress experienced by the flexible display screen 11 and increase service life of the flexible display screen 11.

It should be noted that there are various ways to have the base frame assembly rotatably connected to the first housing and the second housing, including but not limited to hinge connection, a rotating shaft connection, a swing lever connection, or the like.

In some embodiments, an outer sidewall of the base frame assembly may be used to form a decorative sidewall of the foldable electronic device to improve aesthetic appeal of the foldable electronic device.

In some embodiments, at least part of the linkage member is rotatably disposed within the protective space and/or at least part of the supporting assembly is rotatably disposed within the protective space. As such, the protective space may be utilized to protect the linkage member and/or the supporting assembly. Meanwhile, the first housing and the second housing as well as the flexible display screen are used to shield the linkage member and/or supporting assembly, so that the foldable electronic device is more attractive.

Figure 4:
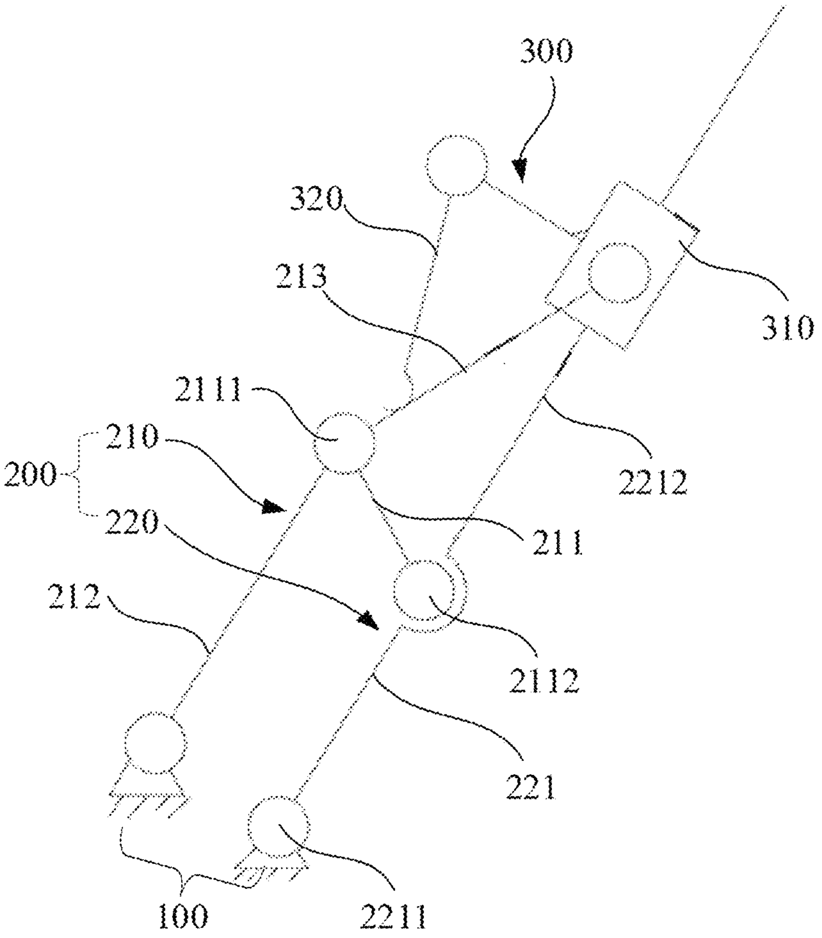
FIG. 4 is a schematic principle diagram of the folding mechanism shown in FIG. 3.
Figure 5:
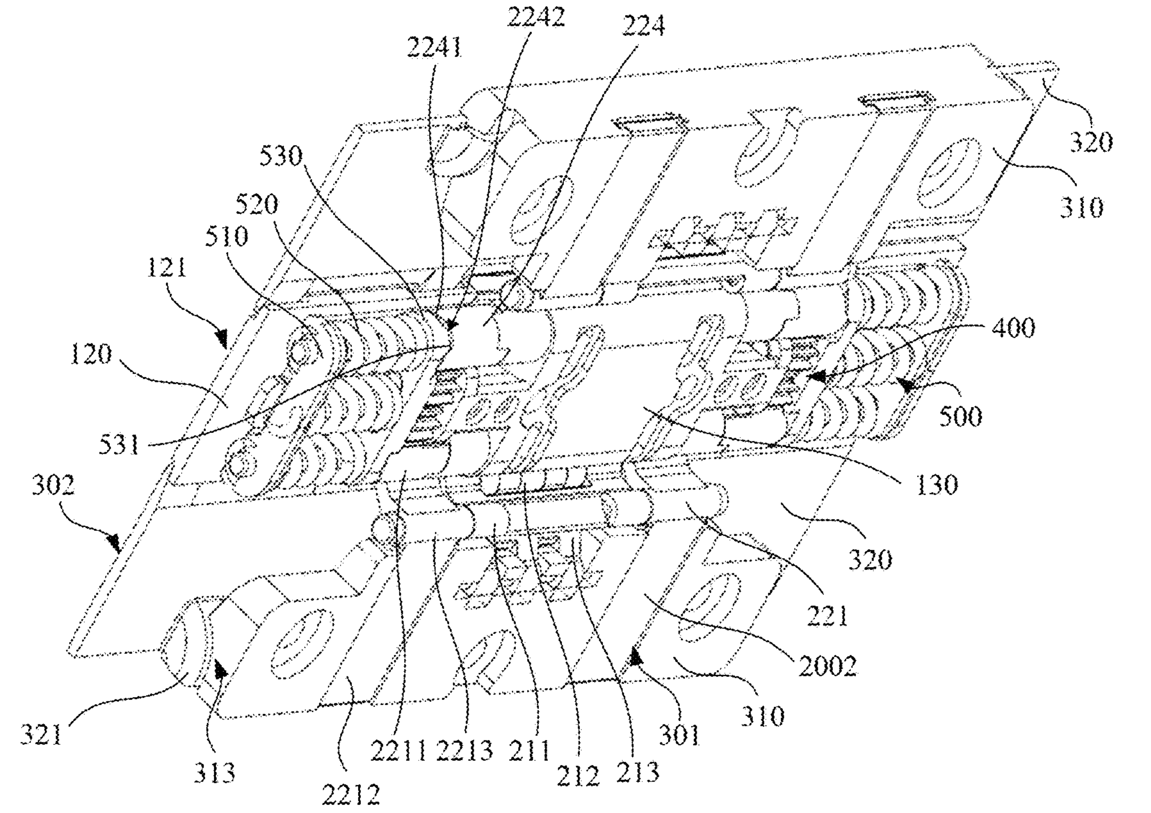
FIG. 5 is a schematic structural diagram of a folding mechanism according to an embodiment (the folding mechanism is in an unfolded state).
Figure 6:
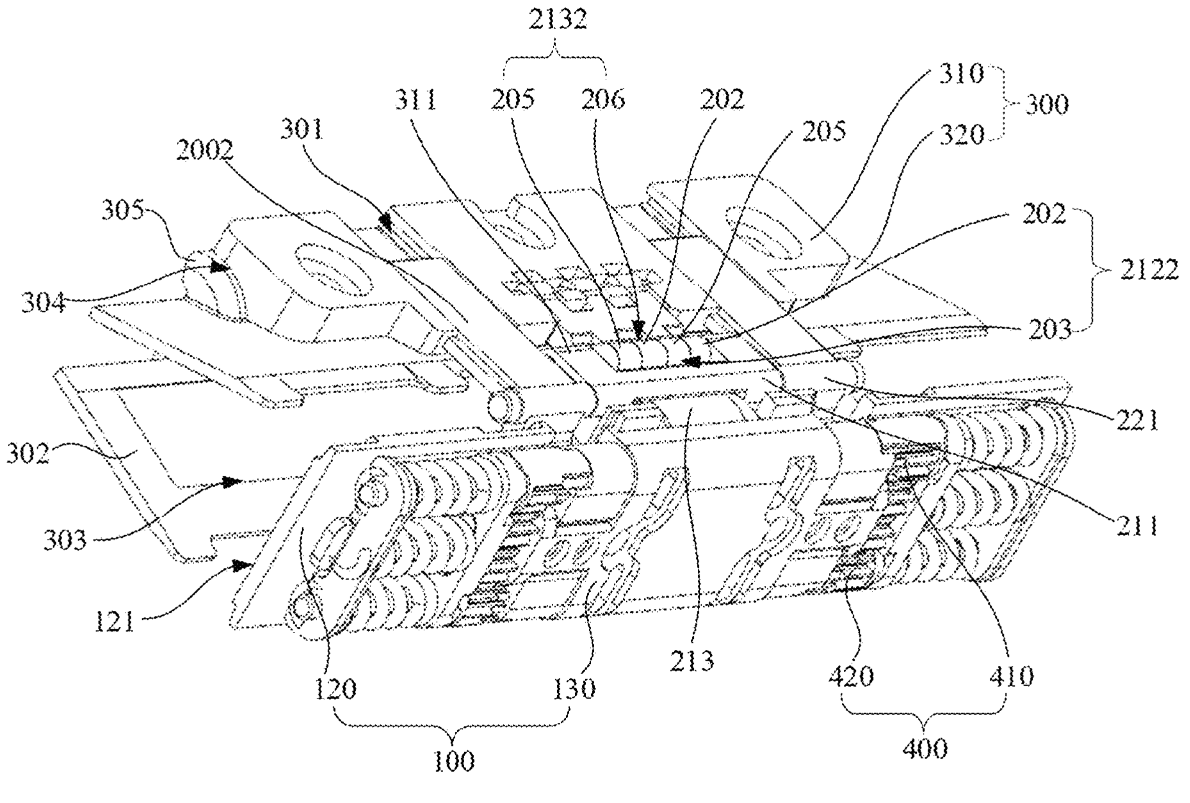
FIG. 6 is a schematic diagram of the folding mechanism shown in FIG. 5 in a folded state.

As shown in FIG. 4 to FIG. 6, in some embodiments, at least one first linkage assembly 210 is respectively arranged on two sides of the base frame assembly 100, the second linkage assembly 220 is arranged on at least one side of the first linkage assembly 210 and side by side relative to the first linkage assembly 210. The first linkage assembly 210 is used for driving the second linkage assembly 220 located on at least one side of the first linkage assembly 210 and the supporting assembly 300 to move. In this way, two sets of linkage members 200 and two sets of supporting assemblies 300 may be provided on one set of folding mechanism 12 to drive the flexible display screen 11 to fold or unfold.

In some other embodiments, one base frame assembly, one supporting assembly and one linkage member constitute a set of folding mechanism. The foldable electronic device includes two sets of folding mechanisms, and the base frame assemblies of the two sets of folding mechanisms are fixedly connected. In this way, with the base frame assemblies fixedly connected with each other, the linkage members and the supporting assemblies are respectively provided in two sets, and are respectively arranged on two sides of the base frame assemblies in a one-to-one correspondence. In a process of folding the first housing and the second housing, a folding side wall is formed by the base frame assemblies fixedly connected together to improve protection performance of the foldable electronic device. In addition, the base frame assemblies can be used to form the decorative side wall of the foldable electronic device, so as to improve aesthetic appeal of the foldable electronic device.

In addition, by having the base frame assemblies of the two sets of folding mechanisms fixedly connected, the two sets of linkage members and the two sets of supporting assemblies can be respectively arranged on two sides of the base frame assemblies in a one-to-one correspondence.

Based on any one of the above embodiments, as shown in FIG. 4, in some embodiments, rotation axis of the first linkage assembly 210 relative to the base frame assembly 100, and rotation axis of the second linkage assembly 220 relative to the base frame assembly 100 are parallel but not coaxial. In this way, the first linkage assembly 210 and the second linkage assembly 220 respectively form a linkage mechanism with the base frame assembly 100, and the first linkage assembly 210 and the second linkage assembly 220 are rotatably connected, so that in the process of synchronously rotating the first linkage assembly 210 and the second linkage assembly 220, a driving force for driving the supporting assembly 300 to slide relative to the second linkage assembly 220 can be generated.

Figure 10:
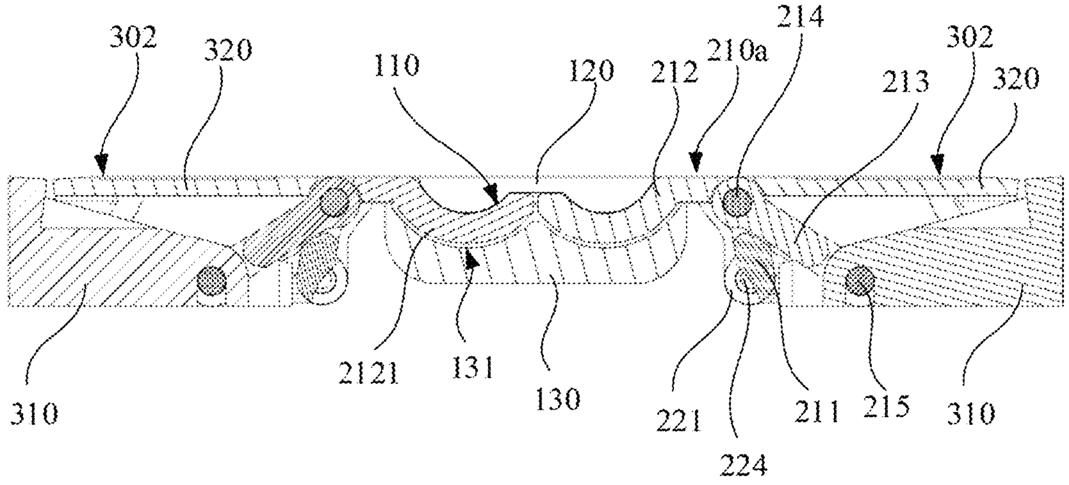
FIG. 10 is a cross-sectional view of the folding mechanism shown in FIG. 5 in a direction of the first linkage assembly.
Figure 11:
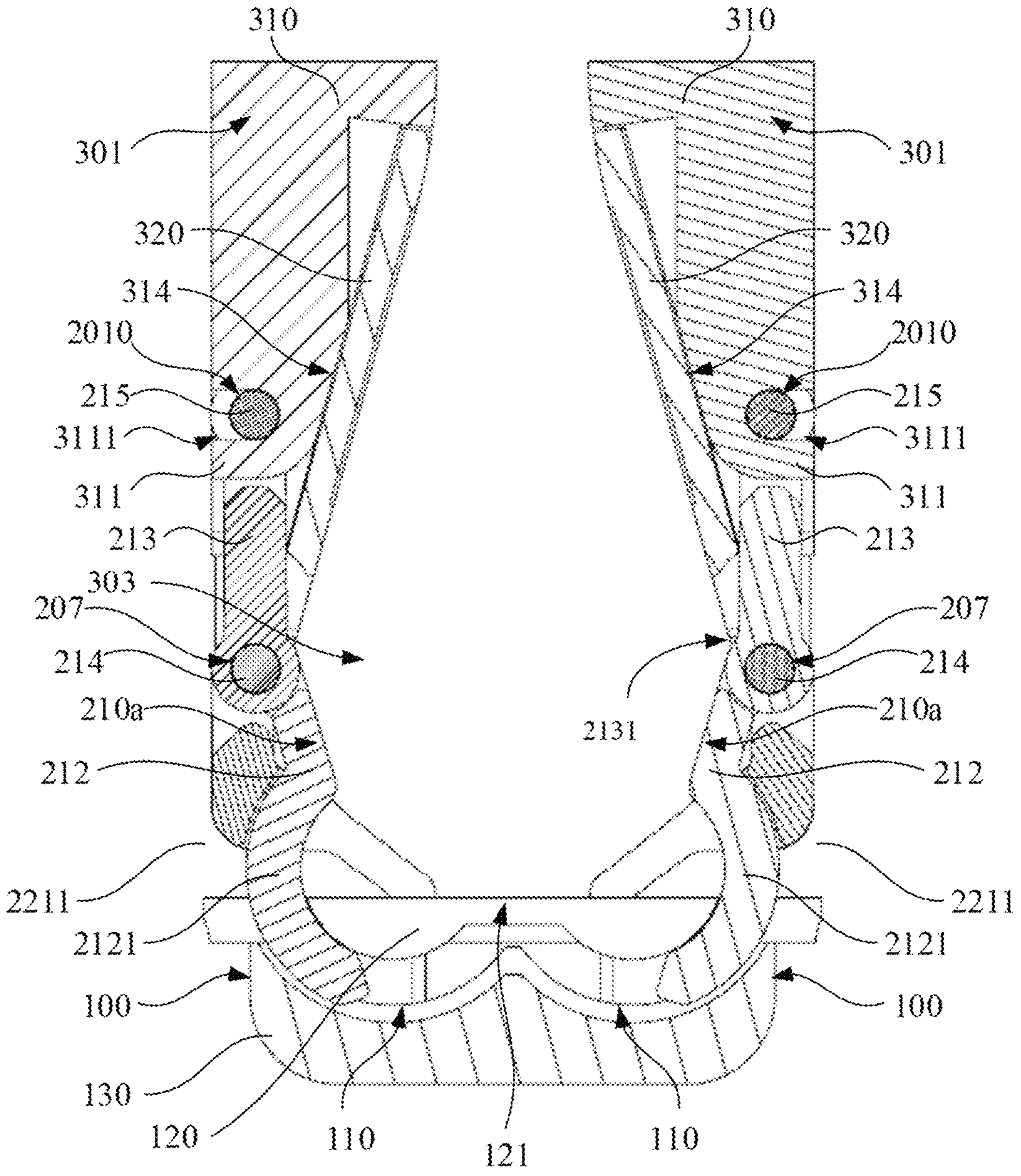
FIG. 11 is a cross-sectional view of the folding mechanism shown in FIG. 6 in a direction of the first linkage assembly.

Based on any one of the above embodiments, as shown in FIGS. 5, 6 and 10, in some embodiments, the base frame assembly 100 includes a first supporting surface 121, and the supporting assembly 300 includes a moving member 310 and a supporting member 320. The moving member 310 is rotatably connected with the supporting member 320, and the moving member 310 is rotatably connected with the first linkage assembly 210 and is slidably connected with the second linkage assembly 220. When the folding mechanism 12 is in the unfolded state, the supporting member 320 cooperates with the first supporting surface 121 to form a supporting structure. When the folding mechanism 12 is in the folded state, the supporting member 320 is disposed at an angle with respect to the first supporting surface 121 to form the accommodating space 303. In this way, in the process of switch from the folded state to the unfolded state of the foldable electronic device 10, the folding mechanism 12 is also switched from the folded state to the unfolded state and the linkage assemblies on the two sides of the base frame assembly 100 rotate around the base frame assembly 100. As the first linkage assembly 210 and the second linkage assembly 220 rotate about the base frame assembly 100, the moving member 310 can be driven to rotate through the second linkage assembly 220, and the first linkage assembly 210 drives the moving member 310 to slide along the length direction of the second linkage assembly 220 and approach the base frame assembly 100. In this case, in the process of moving the supporting member 320 along with the moving member 310, the supporting member 320 is expanded toward the supporting state until the supporting member 320 cooperates with the first supporting surface 121 to form a supporting structure to support the flexible display screen 11 by the supporting structure. When the foldable electronic device 10 is switched from the unfolded state to the folded state, the folding mechanism 12 is also switched from the unfolded state to the folded state, so that when the first linkage assembly 210 and the second linkage assembly 220 rotate about the base frame assembly 100, the moving member 310 can be driven to rotate through the second linkage assembly 220, and the first linkage assembly 210 drives the moving member 310 to slide along the length direction of the second linkage assembly 220 and away from the base frame assembly 100. In this case, in the process of moving the supporting member 320 along with the moving member 310, the supporting member 320 is disposed at an angle with respect to the first supporting surface 121 to form the accommodating space 303 until the foldable electronic device 10 is in the folded state, so that part of the flexible display screen 11 can be bent in the accommodating space 303. The bending stress on the flexible display screen 11 can be reduced, and the service life of the flexible display screen 11 can be prolonged.

It should be noted that the "being provided at an angle" includes an acute angle, a right angle, and an obtuse angle but excludes a straight angle.

On the basis of the foregoing embodiments, as shown in FIG. 5, FIG. 6, and FIG. 10, in some embodiments, the first linkage assembly 210 includes at least a second supporting surface 210*a*, and the supporting member 320 includes a third supporting surface 302. When the folding mechanism 12 is in the unfolded state, the second supporting surface 210*a* is located in a same plane as the first supporting surface 121 and the third supporting surface 302, respectively. The first linkage assembly 210 includes an abutting surface 2131, and when the folding mechanism 12 is in the folded state, the abutting surface abuts against the supporting member 320. In this way, in the process of switch of the foldable electronic device 10 from the folded state to the unfolded state, the folding mechanism 12 is also switched from the folded state to the unfolded state, and the linkage assemblies on the two sides of the base frame assembly 100 rotate around the base frame assembly 100. As the first linkage assembly 210 and the second linkage assembly 220 rotate about the base frame assembly 100, the moving member 310 can be driven to rotate by the second linkage assembly 220, and the first linkage assembly 210 drives the moving member 310 to slide along the length direction of the second linkage assembly 220 and approach the base frame assembly 100. In this case, in the process of moving the supporting member 320 along with the moving member 310, the supporting member 320 is expanded toward the supporting state until the second supporting surface 210*a* is located in the same plane as the first supporting surface 121 and the third supporting surface 302, respectively, to support the flexible display screen 11. When the foldable electronic device 10 is switched from the unfolded state to the folded state, the folding mechanism 12 is also switched from the unfolded state to the folded state, so that when the first linkage assembly 210 and the second linkage assembly 220 rotate about the base frame assembly 100, the moving member 310 can be driven to rotate by the second linkage assembly 220, and the first linkage assembly 210 drives the moving member 310 to slide along the length direction of the second linkage assembly 220 and away from the base frame assembly 100. In this case, in the process of moving the supporting member 320 along with the moving member 310, the supporting member 320 is disposed at an angle with respect to the first supporting surface 121 to form the accommodating space 303, and the abutting surface is used to abut against the supporting member 320.

In some embodiments, the first linkage assembly 210 includes a transmission member 211 and at least two rotating members. One end of the transmission member 211 is rotatably connected with the second linkage assembly 220. Different rotating members are rotatably connected. One rotating member is rotatably connected with the other end of the transmission member 211 and rotatably connected with the base frame assembly 100, and another rotating member is rotatably connected with the moving member 310. In this way, one rotating member is rotatably connected with the base frame assembly 100 and is synchronously rotatably connected with the second linkage assembly 220 through the transmission member 211, so that the rotating member can drive a rotating member rotatably connected with the moving member 310 to rotate, thereby driving the moving member 310 to move in the length direction of the second linkage assembly 220.

With reference to the foregoing embodiments, the first supporting surface 121 may be disposed on a rotating member rotatably connected with the base frame assembly 100, and the abutting surface may be disposed on the transmission member 211.

In some embodiments, in the process of cooperation of the supporting member 320 with the first supporting surface 121 to form the supporting structure, the supporting member 320 may also abut against the abutting surface, so that the supporting member 320 is fixed reliably.

Further, as shown in FIG. 4, in some embodiments, a rotation axis of the transmission member 211 relative to the second linkage assembly 220, a rotation axis of the rotating member relative to the moving member 310, and the rotation axis of the second linkage assembly 220 relative to the base frame assembly 100 are located on the same plane. In this way, the movement of the first linkage assembly, the second linkage assembly 220 and the moving member 310 is smoother, switch of the foldable electronic device between the folded state and the unfolded state is smoother, and the user experience is good.

Optionally, in some embodiments, the other end of the transmission member 211 includes two first rotating portions 2111 disposed at intervals, and a part of the rotating member is disposed between the two first rotating portions 2111 and is rotatably connected to the two first rotating portions 2111. In this way, the part of the rotating member is disposed between the two first rotating portions 2111, and the rotating connection length is large, so that the connection between the transmission member 211 and the rotating member is more reliable and tight.

Further, in some embodiments, the first linkage assembly includes a first rotating shaft 214. The first rotating portions 2111 are provided with a first through hole 201 respectively, and the rotating member is provided with a second through hole 204 coaxial with the first through hole 201. The first rotating shaft 214 penetrates through the first through holes 201 and the second through hole 204. In this way, with the first rotating shaft 214 rotatably mated with the first through holes 201 and the second through hole 204, the transmission member 211 is rotatably connected with the rotating members, which is easy to implement and reliable in connection.

Optionally, in some embodiments, the one end of the transmission member 211 is provided with a second rotating portion 2112, and the second rotating portion 2112 is hinged to the second linkage assembly 220. In this way, the second rotating portion 2112 is hinged to the second linkage assembly, so that the transmission member 211 and the second linkage assembly 220 are rotatably connected reliably.

As shown in FIGS. 5 to 13, in some embodiments, the rotating members include a first rotating member 212 and a second rotating member 213. One end of the first rotating member 212 is rotatably connected with the base frame assembly 100, and the second linkage assembly 220 is rotatably connected with the base frame assembly 100. The other end of the first rotating member 212 is rotatably connected with one end of the second rotating member 213 and the other end of the transmission member 211, and the other end of the second rotating member 213 is rotatably connected to the moving member 310. In this way, in the process of switching of the foldable electronic device 10 from the folded state to the unfolded state, the folding mechanism 12 also switches from the folded state to the unfolded state, and the linkage assemblies on both sides of the base frame assembly 100 rotate around the base frame assembly 100. As the first rotating member 212 and the second linkage assembly 220 rotate along the base frame assembly 100, the moving member 310 can be driven to rotate by the second linkage assembly 220, and the first rotating member 212 and the second rotating member 213 can be driven to rotate by the transmission member 211 synchronously. In this process, the second rotating member 213 drives the moving member 310 to slide along the length direction of the second linkage assembly 220, and to approach the base frame assembly 100. In this case, in the process of moving the supporting member 320 along with the moving member 310, the supporting member 320 is expanded toward the supporting state until the supporting member 320 cooperates with the first supporting surface 121 to form a supporting structure to support the flexible display screen 11 by using the supporting structure. When the foldable electronic device 10 is switched from the open state to the folded state, the folding mechanism 12 is also switched from the unfolded state to the folded state, and the linkage assemblies on both sides of the base frame assembly 100 rotate around the base frame assembly 100, so that when the first rotating member 212 and the second linkage assembly 220 rotate along the base frame assembly 100, the moving member 310 can be driven to rotate by the second linkage assembly 220, and the first rotating member 212 and the second rotating member 213 can be driven to rotate by the transmission member 211 synchronously. In this process, the second rotating member 213 drives the moving member 310 to slide along the length direction of the second linkage assembly 220 and away from the base frame assembly 100. In this case, in the process of moving the supporting member 320 along with the moving member 310, the supporting member 320 is disposed at an angle with respect to the first supporting surface 121 to form the accommodating space 303 until the foldable electronic device 10 is in the folded state, so that part of the flexible display screen 11 can be bent in the accommodating space 303. The bending stress on the flexible display screen 11 can be reduced, and the service life of the flexible display screen 11 can be prolonged.

Based on the above embodiments, as shown in FIG. 4, in some embodiments, a first rotation axis is provided between the first rotating member 212 and the base frame assembly 100, a second rotation axis is provided between the first rotating member 212 and the second rotating member 213, a third rotation axis is provided between the second rotating member 213 and the moving member 310. Any two of the first rotation axis, the second rotation axis and the third rotation axis are parallel to each other, and the second rotation axis is located between the first rotation axis and the third rotation axis. In this way, in the process of driving the moving member 310 to move by the first linkage assembly 210, since any two of the first rotation axis, the second rotation axis, and the third rotation axis are parallel to each other, and the second rotation axis is located between the first rotation axis and the third rotation axis, no interference occur between the first rotating member 212 and the second rotating member 213, between the transmission member 211 and the first rotating member 212 as well as the second rotating member 213, and between the second rotating member 213 and the moving member 310, so that the movement is smooth, the blockage is reduced, and the operation experience of the foldable electronic device 10 is improved.

As shown in FIGS. 5 to 13, in some embodiments, one end of the first rotating member 212 includes a first guiding portion 2121, the base frame assembly 100 is provided with a first arc-shaped groove 110, and the first guiding portion 2121 is rotatably fitted with the first arc-shaped groove 110. In this way, the first guiding portion 2121 is rotatably engaged with the first arc-shaped groove 110, so that part of the first rotating member 212 can be inserted in the base frame assembly 100 while being movable, thereby avoiding formation of connection bumps that presses against the flexible display screen 11, so that the flexible display screen 11 can be flatly arranged on the folding mechanism 12.

Optionally, the first guiding portion 2121 is of an arc shape and may be inserted into the first arc-shaped groove 110.

As shown in FIG. 6 and FIGS. 9 to 11, in some embodiments, the other end of the first rotating member 212 is provided with first hinge portions 2122, and one end of the second rotating member 213 is provided with a second hinge portion 2132. A part of the second hinge portion 2132 is embedded in the first hinge portions 2122 and is hinged with the first hinge portions 2122. In this way, the part of the second rotating member 213 is disposed between the two first hinge portions 2122, so that the connection between the rotating members is more reliable and tight.

Based on the above embodiments, in some embodiments, the first linkage assembly includes a first rotating shaft 214, the first hinge portion 2122 includes at least two first rotating bodies 202 arranged at intervals. A first gap 203 is formed between two adjacent first rotating bodies 202 at intervals, and the first rotating body 202 is provided with a second through hole 204. The second hinge portion 2132 includes at least two second rotating bodies 205 arranged at intervals, and a second gap 206 is formed between every two adjacent second rotating bodies 205 at intervals. The second rotating body 205 is provided with a third through hole 207. One second rotating body 205 is inserted into the first gap 203, one first rotating body 202 is inserted into the second gap 206, so that the second through hole 204 and the third through hole 207 are coaxially arranged. The first rotating shaft 214 penetrates through the second through hole 204 and the third through hole 207. In this way, the first gap 203 formed by two adjacent first rotating bodies 202 is used to accommodate the second rotating body 205, and the second gap 206 formed by the two adjacent second rotating bodies 205 is used to accommodate the first rotating body 202, so that the first rotating member 212 and the second rotating member 213 are meshed with each other and are tightly connected, consequently the rotating connecting length is large, and the stress intensity is high. Then, the first rotating shaft 214 is rotatably engaged with the second through hole 204 and the third through hole 207 to realize the rotational connection between the first rotating member 212 and the second rotating member 213, which is easy to implement and reliable in connection.

Further, as shown in FIG. 6 and FIGS. 9 to 11, in some embodiments, the other end of the transmission member 211 includes two first rotating portions 2111 disposed at intervals, and the first rotating portions 2111 are provided with a first through hole 201. The first rotating body 202 and the second rotating body 205 are disposed between the two first rotating portions 2111, the first through hole 201, the second through hole 204 and the third through hole 207 are coaxially disposed, and the first rotating shaft 214 penetrates through the first through hole 201, the second through hole 204 and the third through hole 207. In this way, the first rotating body 202 and the second rotating body 205 are arranged between the two first rotating portions 2111, so that the first rotating body 202, the second rotating body 205 and the transmission member are nested with each other, consequently, the connection is tight, the rotating connection length is large, and the stress intensity is high. Then, the first rotating shaft 214 is rotatably engaged with the first through hole 201, the second through hole 204 and the third through hole 207, so that the other end of the transmission member 211 is rotatably connected to the first rotating member 212 and the second rotating member 213, respectively. The structure is compact, the implementation is easy, and the connection is reliable.

As shown in FIG. 6 and FIGS. 9 to 11, in some embodiments, the first linkage assembly includes a second rotating shaft 215, and the other end of the second rotating member 213 includes a third hinge portion 2133. The third hinge portion 2133 includes at least two third rotating bodies 208 arranged at intervals, a third gap 209 is formed between every two adjacent third rotating bodies 208 at intervals, and the third rotating body 208 is provided with a fourth through hole 2010. The moving member 310 includes at least two mounting bodies 311 arranged at intervals, and a fourth gap 312 is formed between every two adjacent mounting bodies 311 at intervals. Each mounting body 311 is provided with a rotating groove 3111. One mounting body 311 is inserted into the third gap 209, and one third rotating body 208 is inserted into the fourth gap 312. The fourth through hole 2010 is coaxially arranged with the rotating groove 3111, and the second rotating shaft 215 penetrates through the fourth through hole 2010 and the rotating groove 3111. In this way, the third gap 209 formed by the two adjacent third rotating bodies 208 is used to accommodate the mounting body 311, and the fourth gap 312 formed by the two adjacent mounting bodies 311 is used to accommodate the third rotating body 208, so that the second rotating member 213 and the moving member 310 are nested with each other, consequently, the two are tightly connected, the rotating connecting length is large, and the stress intensity is high. Then, the second rotating shaft 215 is connected to the fourth through hole 2010, then the second rotating shaft 215 is sleeved in the rotating groove 3111, so that the second rotating member 213 is rotatably connected to the moving member 310, which is easy to implement. Besides, the connection is reliable.

Based on any one of the foregoing embodiments, as shown in FIG. 6, FIG. 8, FIG. 9, and FIG. 12 to FIG. 13, in some embodiments, the second linkage assembly 220 includes a third rotating member 221, the first linkage assembly 210 includes a transmission member 211, and the supporting assembly 300 includes a moving member 310. The third rotating member 221 is rotatably connected to the base frame assembly 100 and the transmission member 211 respectively, and the third rotating member 221 is slidably connected to the moving member 310. In this way, the transmission member 211 is used to drive the third rotating member 221 to rotate synchronously and the transmission member 211, so that the transmission member 211 is used to drive the first linkage assembly 210 to rotate synchronously with the moving member 310, and the first linkage assembly 210 is used to drive the moving member 310 to slide along the third rotating member 221.

Specifically, referring to FIG. 5, FIG. 6, and FIG. 10 to FIG. 13, in the process of switching the foldable electronic device 10 from the folded state to the unfolded state, the folding mechanism 12 is also switched from the folded state to the unfolded state, and the linkage assemblies on both sides of the base frame assembly 100 rotate around the base frame assembly 100. As the first linkage assembly 210 and the second linkage assembly 220 rotate synchronously about the base frame assembly 100, the moving member 310 can be driven to rotate through the third rotating member 221, and the first linkage assembly 210 drives the moving member 310 to slide along the length direction of the third rotating member 221 and approach the base frame assembly 100. In this case, in the process of moving the supporting member 320 along with the moving member 310, the supporting member 320 is expanded toward the supporting state until the supporting member 320 cooperates with the first supporting surface 121 to form a supporting structure to support the flexible display screen 11 by using the supporting structure. When the foldable electronic device 10 is switched from the unfolded state to the folded state, the folding mechanism 12 is also switched from the unfolded state to the folded state, so that when the first linkage assembly 210 and the third rotating member 221 rotate about the base frame assembly 100, the moving member 310 can be driven to rotate through the third rotating member 221, and the first linkage assembly 210 drives the moving member 310 to slide along the length direction of the third rotating member 221 and away from the base frame assembly 100. In this case, in the process of moving the supporting member 320 along with the moving member 310, the supporting member 320 is disposed at an angle with respect to the first supporting surface 121 to form the accommodating space 303 until the foldable electronic device 10 is in the folded state, so that part of the flexible display screen 11 can be bent in the accommodating space 303. The bending stress on the flexible display screen 11 can be reduced, and the service life of the flexible display screen 11 can be prolonged.

Further, as shown in FIG. 6, FIG. 8, FIG. 9, and FIG. 12 to FIG. 13, in some embodiments, the third rotating member 221 includes a third rotating portion 2211 and a second guiding portion 2212. The third rotating portion 2211 is rotatably connected to the base frame assembly 100. The moving member 310 is provided with a sliding groove 301 slidably mated with the second guiding portion 2212. In this way, the third rotating member 221 is rotatably connected to the base frame assembly 100 through the third rotating portion 2211. During driving the rotation of the moving member 310, the moving member 310 is driven by the first linkage assembly 210 to slide along the length direction of the second guiding portion 2212.

In combination with the first rotating member 212 and the second rotating member 213, when the foldable electronic device 10 is switched from the folded state to the unfolded state, the folding mechanism 12 is also switched from the folded state to the unfolded state, and the linkage assemblies on the two sides of the base frame assembly 100 rotate around the base frame assembly 100. As the first linkage assembly 210 and the second linkage assembly 220 rotate synchronously about the base frame assembly 100, when the moving member 310 is driven to rotate through the third rotating member 221, the first rotating member 212 is in synchronous transmission with the transmission member 211, and thus the second rotating member 213 is driven to rotate in a set direction to drive the moving member 310 to slide along the length direction of the second guiding portion 2212 and approach the base frame assembly 100. In this case, in the process of moving the supporting member 320 along with the moving member 310, the supporting member 320 is expanded toward the supporting state until the supporting member 320 cooperates with the first supporting surface 121 to form a supporting structure to support the flexible display screen 11 by using the supporting structure. When the foldable electronic device 10 is switched from the unfolded state to the folded state, the folding mechanism 12 is also switched from the unfolded state to the folded state, so that when the first linkage assembly 210 and the third rotating member 221 rotate about the base frame assembly 100, when the moving member 310 is driven to rotate through the third rotating member 221, the first rotating member 212 is in synchronous transmission with the transmission member 211, and thus the second rotating member 213 is driven to rotate in the set direction to drive the moving member 310 to slide along the length direction of the second guiding portion 2212 and away from the base frame assembly 100. In this case, in the process of moving the supporting member 320 along with the moving member 310, the supporting member 320 is disposed at an angle with respect to the first supporting surface 121 to form the accommodating space 303 until the foldable electronic device 10 is in the folded state, so that part of the flexible display screen 11 can be bent in the accommodating space 303. The bending stress on the flexible display screen 11 can be reduced, and the service life of the flexible display screen 11 can be prolonged.

It should be noted that there may be a plurality of specific implementations of the second guiding portion 2212, including but not limited to a guide rod, a guide block, a guide bar, or the like.

In addition, the "second guiding portion 2212" may be part of the third rotating member 221, that is, the "second guiding portion 2212" and other parts of the third rotating member 221, such as the third rotating portion 2211, are integrally formed; or may be independent components that may be separated from other parts of the third rotating member 221, such as the third rotating portion 2211, that is, the "second guiding portion 2212" may be manufactured independently, and then combined with other parts of the third rotating member 221, such as the third rotating portion 2211 to form an entity.

Similarly, "certain body" and "certain part" may be part of a corresponding "member", that is, "a certain body", "a certain part" and other parts of the "member" are integrally formed; or may be a separate member that may be separable from other parts of the "member", that is, "a certain body" or "a certain part" may be manufactured independently and then combined with other parts of the "member" into a whole. The expression of the above "certain body" and "a certain part" of the present disclosure is only one embodiment, and for convenience of reading, not a limitation to the scope of the protection of the present disclosure. As long as the above features are included and the functions are the same, it should be understood as equivalent technical solutions of the present disclosure.

Further, as shown in FIG. 6, FIG. 8, FIG. 9, FIG. 12 to FIG. 13, in some embodiments, the third rotating member 221 further includes a fourth rotating portion 2213. The fourth rotating portion 2213 is located between the second guiding portion 2212 and the third rotating portion 2211 and is rotatably connected to the transmission member 211. In this way, the fourth rotating member 2213 is arranged between the second guiding portion 2212 and the third rotating portion 2211 and is rotatably connected with the transmission member 211, so that a four-bar mechanism is formed by the third rotating member 221, the transmission member 211, the first rotating member 212 and the base frame assembly 100. The moving member 310 is driven to rotate around the third rotating member 221 through the deformation of the four-bar mechanism. The second rotating member 213 is used for driving the moving member 310 to move along a guiding direction of the second guiding portion 2212, and the moving member 310 is used to drive the supporting member 320 to rotate, so that switching of the supporting member 320 between the supporting state and the avoiding state is realized, and transmission is reliable.

Optionally, in some embodiments, the third rotating member 221 includes a third rotating shaft 222 mounted on the base frame assembly 100, and the third rotating portion 2211 includes a first rotating hole 2001 rotatably engaged with the third rotating shaft 222. The fourth rotating portion 2213 includes a fourth rotating shaft 223, and the fourth rotating shaft 223 is rotatably connected to the transmission member 211. In this way, the third rotating member 221 is rotatably disposed on the base frame assembly 100 by engaging the third rotating shaft 222 mounted on the base frame assembly 100 with the first rotating hole 2001. Then, the fourth rotating shaft 223 is rotatably connected to the transmission member 211, so that the third rotating member 221 and the transmission member 211 are rotatably connected, which is compact in structure and easy to implement.

As shown in FIG. 6, FIG. 8, FIG. 9, FIG. 12 to FIG. 13, in some embodiments, the second guiding portion 2212 includes a guiding body 2002 extending from the fourth rotating portion 2213 to a side away from the third rotating portion 2211, and the guiding body 2002 is slidably mated with the sliding groove 301. In this way, the moving member 310 is slidably mated with the guiding body 2002 through the sliding groove 301, so that the supporting member 320 can be driven to switch between the supporting state and the avoiding state, thus the supporting member 320 can support the flexible display screen 11 in the supporting state, and in the avoiding state, the accommodating 303 can be formed to avoid and accommodate the flexible display screen 11.

Figure 12:
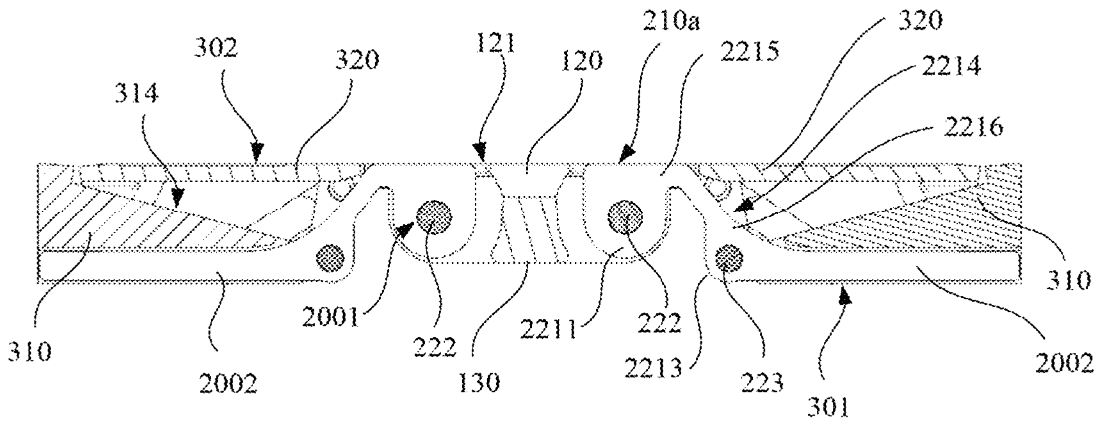
FIG. 12 is a cross-sectional view of the folding mechanism shown in FIG. 5 in the direction of the second linkage assembly.
Figure 13:
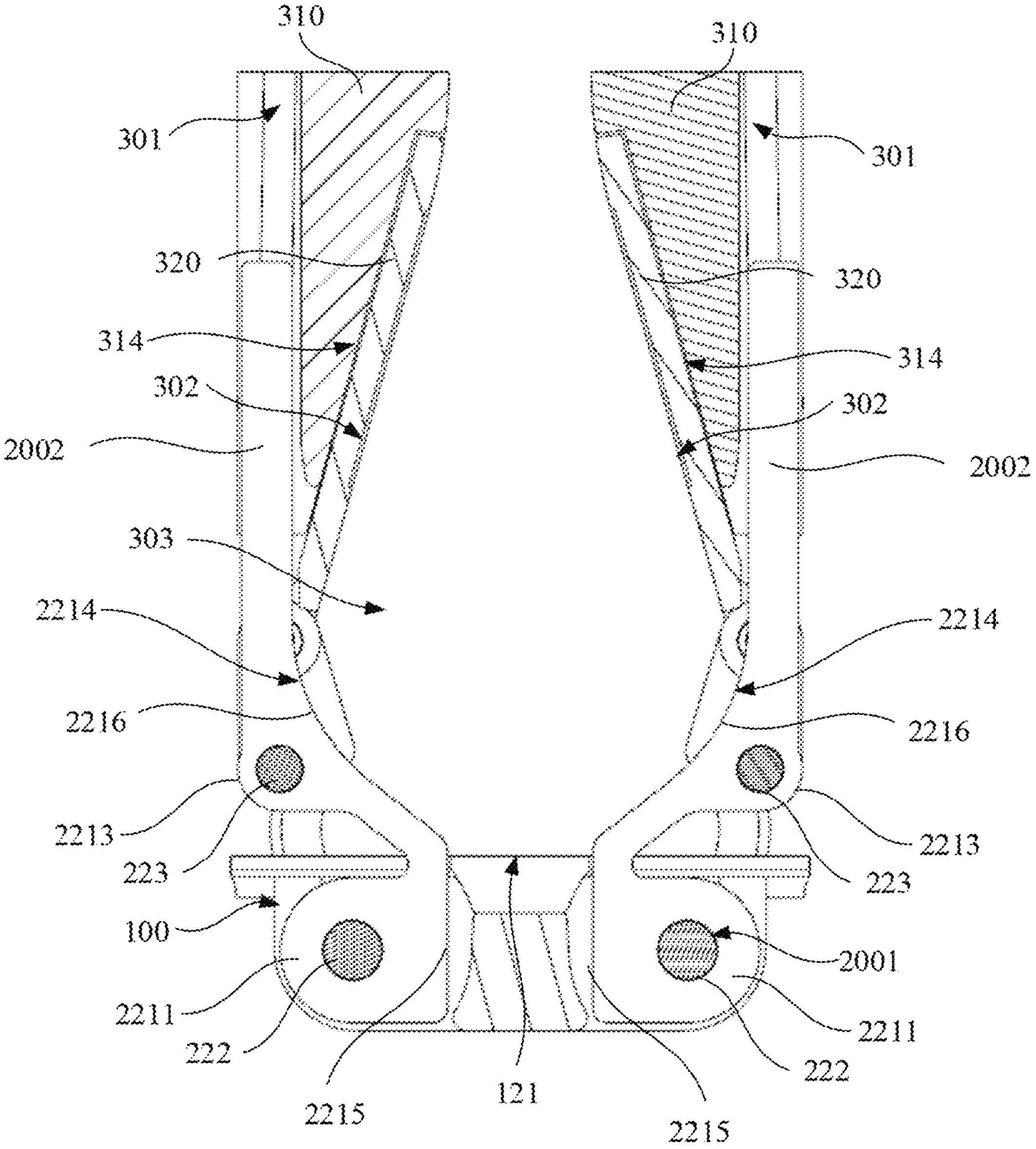
FIG. 13 is a cross-sectional view of the folding mechanism shown in FIG. 6 in the direction of the second linkage assembly.

As shown in FIG. 12 and FIG. 13, in some embodiments, the third rotating member 221 includes an accommodating recess 2214, and the accommodating recess 2214 is disposed between the second guiding portion 2212 and the third rotating portion 2211. When the folding mechanism 12 is in the folded state, the accommodating recess 2214, the third supporting surface 302, and the first supporting surface 121 enclose the accommodating space 303. In this way, by using the accommodating recess 2214, the bending degree of the flexible display screen 11 can be better adapted. A shape of the accommodating recess 2214 can be designed according to the bending degree of the flexible display screen 11. The accommodating space 303 can be formed, and the accommodating recess 2214 can fit the flexible display screen 11 to support the bending of the flexible display screen 11.

It should be noted that there may be a plurality of implementations for the accommodating recesses 2214, including circular arc grooves, elliptical arc grooves, water drop-shaped grooves, and the like.

Optionally, the third rotating member 221 includes a supporting body 2215 rotatably connected to the base frame assembly 100 and an arc-shaped body 2216 connected to the supporting body 2215. The supporting body 2215 is provided with a third rotating portion 2211, and the arc-shaped body 2216 is configured to form the accommodating recess 2214. In this way, when the folding mechanism 12 is in the unfolded state, the supporting member 320 cooperates with the first supporting surface 121 and the supporting body 2215 to form a supporting structure. When the folding mechanism 12 is in the folded state, the supporting member 320 and the arc-shaped body 2216 are disposed at an angle with respect to the first supporting surface 121 to form the accommodating space 303.

In addition, the arrangement of the arc-shaped body 2216 also facilitates the insertion of the guiding body 2002 below the moving member 310 to be away from the first supporting surface 121, so that the transition between the supporting body 2215 and the guiding body 2002 is smooth, and the interference is reduced.

In an example, when the folding mechanism 12 is in the folded state, the two third rotating members 221 are disposed opposite to each other, and the arc-shaped bodies 2216 of the two third rotating members 221 may form a water drop-shaped accommodating space 303.

In some embodiments, the folding mechanism 12 further includes synchronizing gears and a damping assembly 500, and the synchronizing gears and the damping assembly 500 are disposed on the third rotating shaft 222. In this way, the synchronous gears and the damping assembly 500 are arranged on the third rotating shaft 222 to realize synchronous rotation of the two sets of second linkage assembly 220 with damping, so that the foldable electronic device 10 does not easily rotate and is convenient to use.

Based on any one of embodiments of the moving member 310, as shown in FIG. 5, FIG. 6, FIG. 8, FIG. 12 and FIG. 13, in some embodiments, the moving member 310 is provided with a first arc-shaped guiding portion 313, the supporting member 320 is provided with a second arc-shaped guiding portion 321, and the first arc-shaped guiding portion 313 is in guiding connection with the second arc-shaped guiding portion 321, so that the moving member 310 is rotatably connected with the supporting member 320. In this way, the first arc-shaped guiding portion 313 is guidably connected with the second arc-shaped guiding portion 321, so that the moving member 310 is rotatably connected with the supporting member 320, and the rotation range is controllable.

It should be noted that the mating forms of the first arc-shaped guiding portion 313 and the second arc-shaped guiding portion 321 may include, but are not limited to, an arc-shaped sliding rail structure, an arc-shaped guide rail-guide block structure, a hinged structure, or the like.

Further, as shown in FIG. 6, FIG. 8, FIG. 12, and FIG. 13, in some embodiments, one of the first arc-shaped guiding portion 313 and the second arc-shaped guiding portion 321 is provided with a second arc-shaped groove 304, the other is provided with a second arc-shaped body 305, and the second arc-shaped body 305 is in guiding fit with the second arc-shaped groove 304. In this way, by inserting the second arc-shaped body 305 into the second arc-shaped groove 304, the rotation fit is achieved, so that part of the supporting member 320 can be embedded in the moving member 310 for movement. Formation of connection convex point to press against the flexible display screen 11 can be avoided so that the flexible display screen 11 can be flat disposed on the folding mechanism 12.

Further, as shown in FIG. 10 to FIG. 13, in some embodiments, the moving member 310 is provided with an avoiding surface 314. In a-cross-section of the folding mechanism 12 in the thickness direction, the closer to the side wall of the base frame assembly 100 a portion of the avoiding surface 314 is, the farther away from the first supporting surface 121 the portion is. When the folding mechanism 12 is in the unfolded state, a portion of the supporting member 320 is disposed away from the avoiding surface 314. When the folding mechanism 12 is in the folded state, the supporting member 320 contacts or is close to the avoiding surface 314. In this way, with the avoiding surface 314, when the folding mechanism 12 is in the unfolded state, a portion of the supporting member 320 is disposed away from the avoiding surface 314 and abuts against the first linkage assembly 210, and another portion of the supporting member 320 abuts against the avoiding surface 314, so that the supporting member 320 reliably provides a supporting force. When the folding mechanism 12 is in the folded state, the supporting member 320 contacts or is close to the avoiding surface 314, so that avoidance may occur to form the accommodating space 303.

It should be noted that the "avoiding surface 314" may be provided in various ways including, but not limited to, an avoiding inclined surface, an avoiding curved surface, as long as the avoiding space which does not interfere with the movement of the supporting member 320 can be formed.

As shown in FIG. 10 to FIG. 13, in some embodiments, the supporting member 320 is a planar plate, the avoiding surface 314 is an avoiding inclined surface fitting the supporting member 320. In a cross-section in the thickness direction of the folding mechanism 12, the avoiding inclined surface is inclined downward from one end away from the base frame assembly 100 to other end close to the base frame assembly 100, so as to be gradually away from the first supporting surface 121. In this way, with the avoiding inclined surface, when the folding mechanism 12 is in the unfolded state, one end of the supporting member 320 is disposed away from other end of the avoiding inclined surface and abuts against the first linkage assembly 210, and other end of the supporting member 320 abuts against one end of the avoiding inclined surface. In the process of switching the folding mechanism 12 from the unfolded state to the folded state, the one end of the supporting member 320 is gradually close to the other end of the avoiding inclined surface until the supporting member 320 contacts the avoiding inclined surface, and the supporting member 320 can be reliably supported by using the avoiding inclined surface.

Similarly, the supporting member 320 is an arc-shaped plate, the avoiding surface 314 is an avoiding curved surface fitting the supporting member 320. In a cross-section in the thickness direction of the folding mechanism 12, the avoiding curved surface bends downwards from one end away from the base frame assembly 100 to other end close to the base frame assembly 100, so as to be gradually away from the first supporting surface 121. In this way, with the avoiding curved surface, when the folding mechanism 12 is in the unfolded state, one end of the supporting member 320 is disposed away from the other end of the avoiding curved surface and abuts against the first linkage assembly 210, and the other end of the supporting member 320 abuts against the one end of the avoiding curved surface. In the process of switching the folding mechanism 12 from the unfolded state to the folded state, the one end of the supporting member 320 is gradually close to the other end of the avoiding curved surface until the supporting member 320 contacts the avoiding curved surface, and the supporting member 320 can be reliably supported by using the avoiding curved surface.

Based on any one of embodiments of the above moving member, in some embodiments, the folding mechanism further includes a damping assembly, and the damping assembly is rotatably mated with the first linkage assembly and/or the second linkage assembly with damping. In this way, by arranging the damping assembly, the linkage member can be rotatably connected to the base frame assembly with damping, so that the foldable electronic device does not rotate easily and is convenient to use.

It should be noted that the damping assembly may be provided on any one of the first rotating shaft, the second rotating shaft, the third rotating shaft, and the fourth rotating shaft, so as to meet the above requirements.

In some embodiments, the damping assembly is disposed on the third rotating shaft. In this way, with the damping assembly arranged on the third rotating shaft, rotation of the two sets of second linkage assemblies with damping is realized, so that the foldable electronic device does not rotate easily and is convenient to use.

Figure 7:
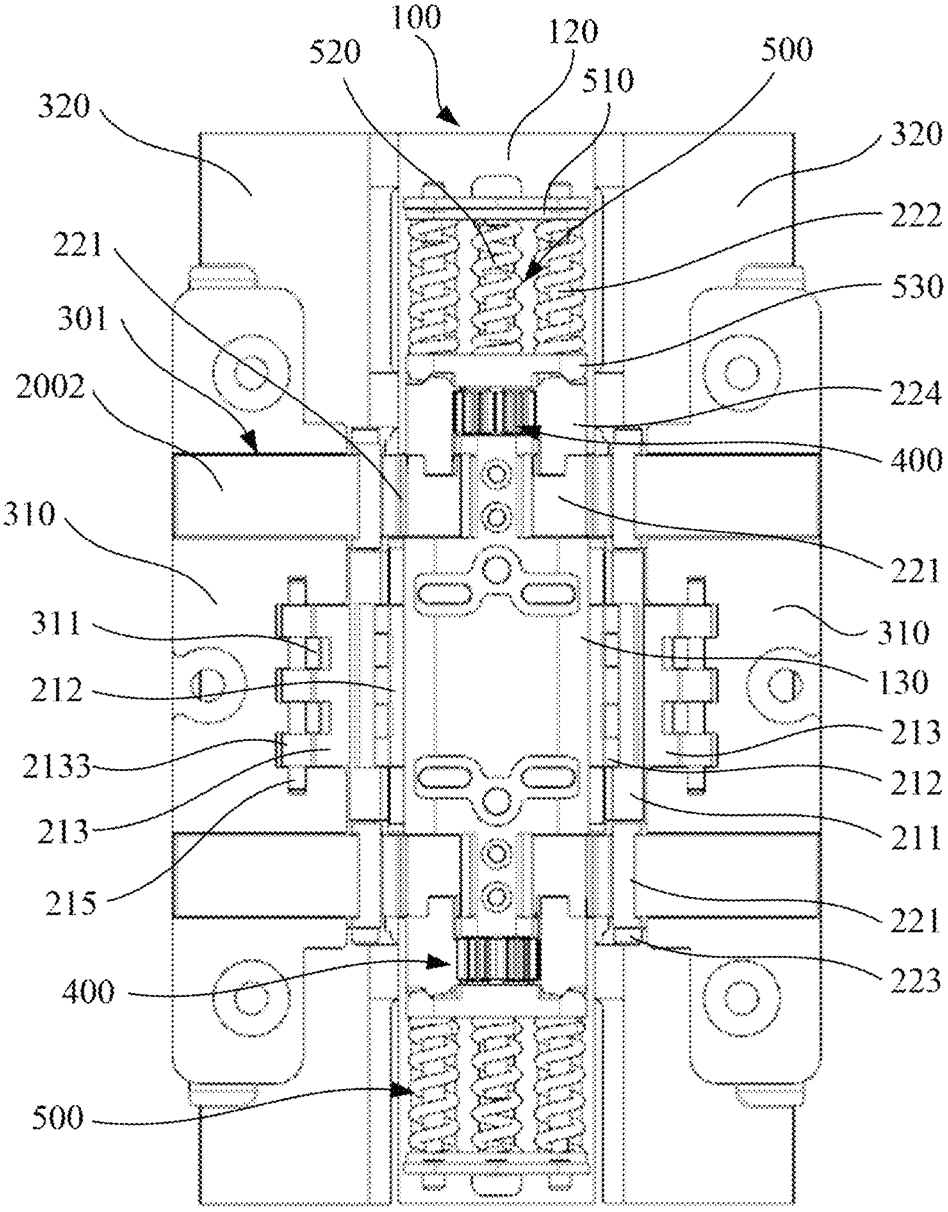
FIG. 7 is a schematic structural diagram of the folding mechanism shown in FIG. 5 at another viewing angle.
Figure 8:
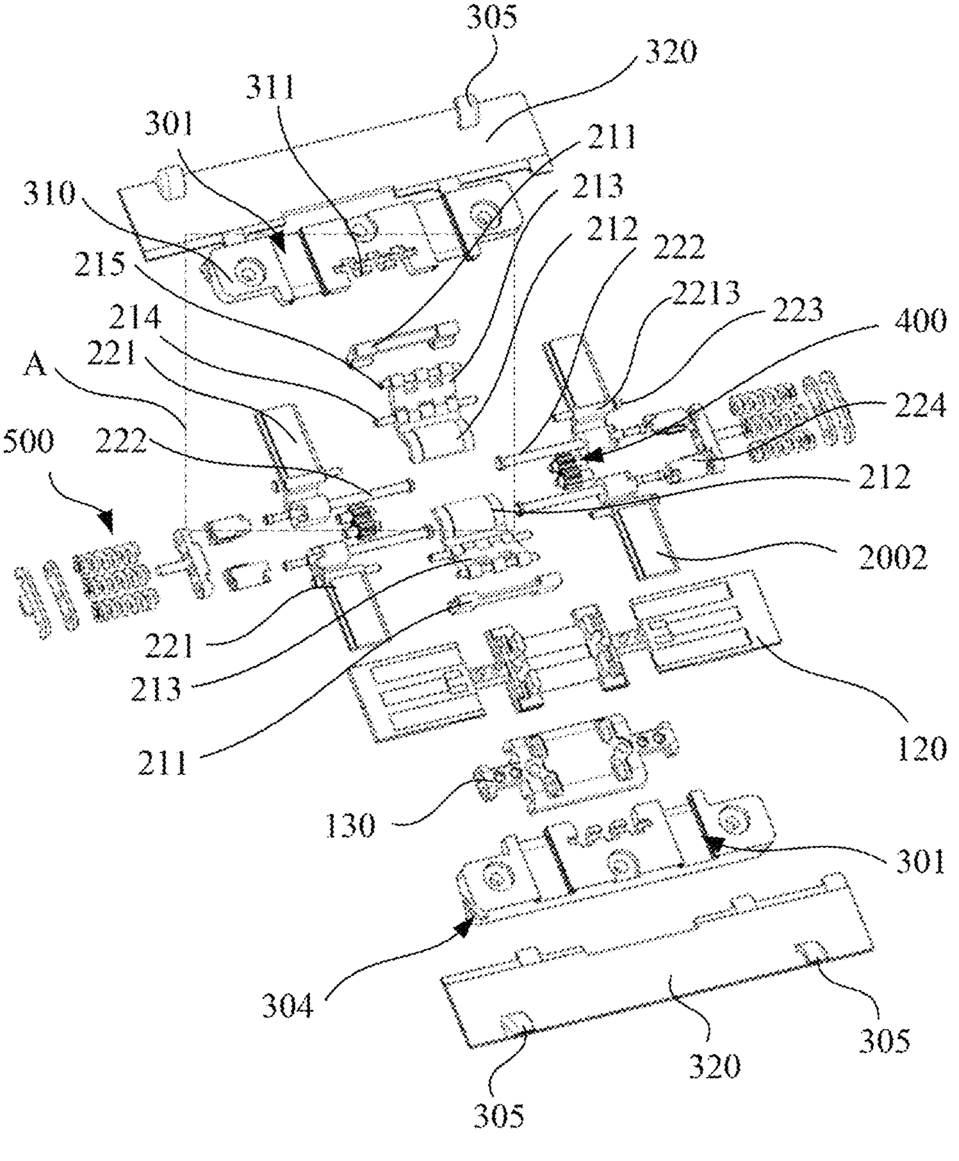
FIG. 8 is an exploded view of the folding mechanism shown in FIG. 5.
Figure 9:
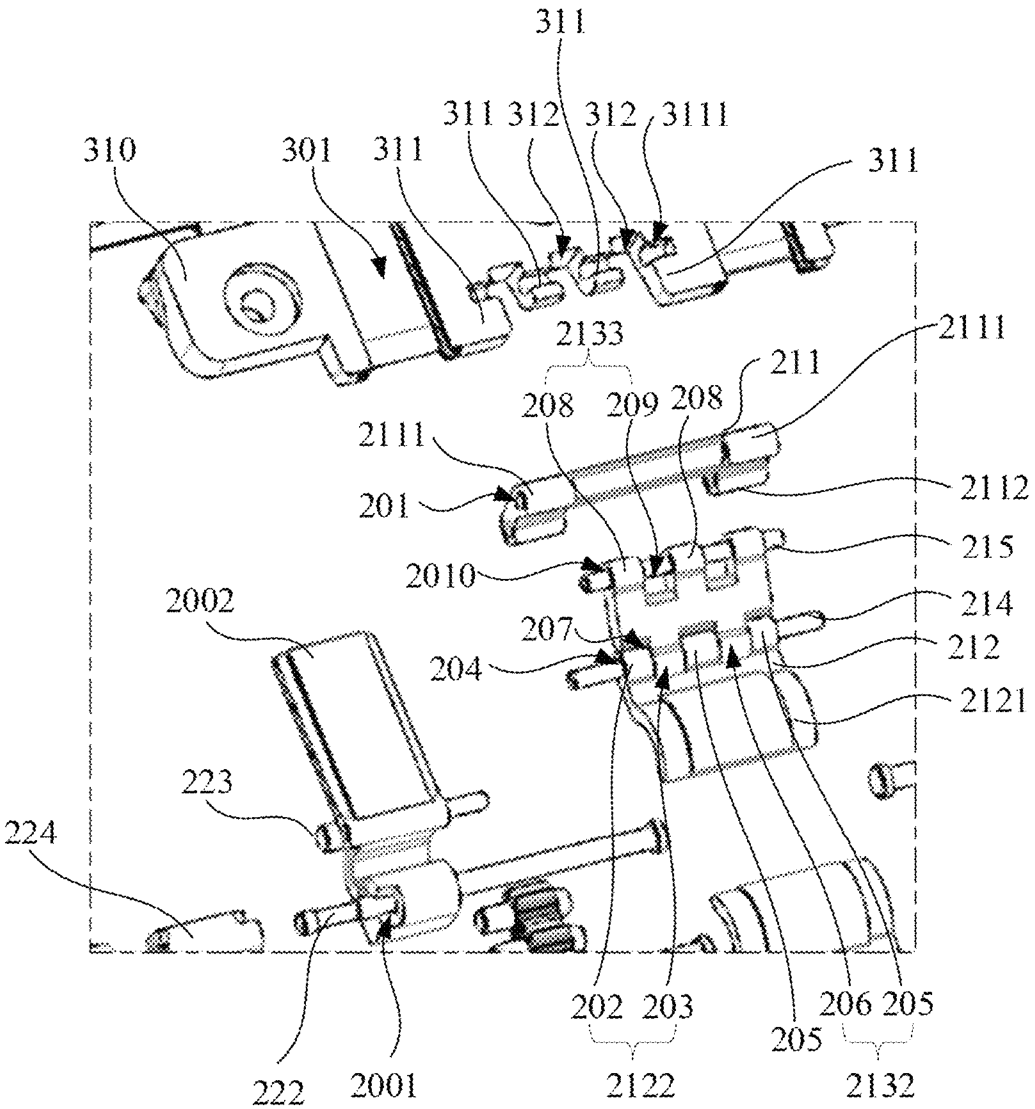
FIG. 9 is a partial enlarged view of the area A shown in FIG. 8.
Figure 14:
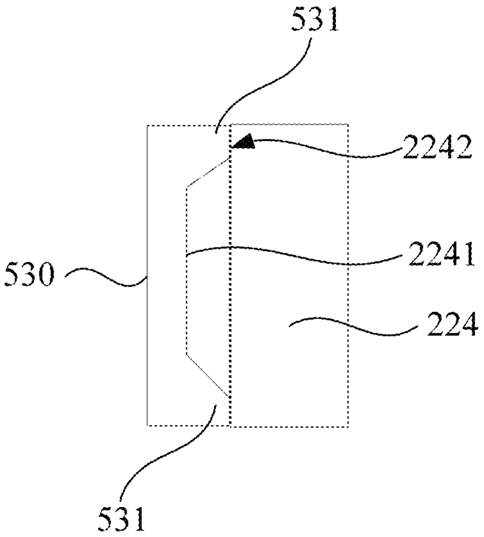
FIG. 14 is a schematic diagram showing mating between a mating portion and a rotation stopping member shown according to an embodiment.

Further, as shown in FIG. 5, FIG. 7 and FIG. 14, in some embodiments, the second linkage assembly 220 includes a third rotating shaft 222 and a mating portion 224, and the damping assembly 500 includes an elastic member 520, a rotation stopping member 530, and a mounting member 510 fixedly connected to the base frame assembly 100. One end of the third rotating shaft 222 is fixed on the mounting member 510, the other end of the third rotating shaft 222 is fixed to the base frame assembly 100. The elastic member 520 and the rotation stopping member 530 are sleeved on the third rotating shaft, and the elastic member 520 is disposed between the mounting member 510 and the rotation stopping member 530. One of the rotation stopping member 530 and the mating portion 224 is provided with a pressing protrusion 531, and the other is provided with a bearing surface 2241 abutting against the pressing protrusion 531 and a second groove 2242 for receiving the pressing protrusion 531. When the first linkage assembly 210 rotates, the pressing protrusion 531 abuts against the bearing surface 2241; when the supporting member 320 is in the folded state and/or the unfolded state, the pressing protrusion 531 is disposed in the second groove 2242, so that the first linkage assembly 210 is fixed relative to the base frame assembly 100, and can only drive the supporting member 320 to rotate toward the folded state or toward the unfolded state. In this way, when the folding mechanism 12 is in the folded state, the supporting member 320 is in the avoiding state, and the pressing protrusion 531 is disposed in the second groove 2242, so that the linkage member 200 is fixed relative to the base frame assembly 100, and can only drive the supporting member 320 to move toward the supporting state. In addition, under a force of the elastic member 520, a greater turning force is to be applied so that the pressing protrusion 531 is disengaged from the second groove 2242 and enters the bearing surface 2241, so that the flexible display screen 11 of the foldable electronic device 10 can be fixed firmly when in the folded state, so as to facilitate the user to carry. And/or, when the folding mechanism 12 is in the unfolded state, the supporting member 320 is in the supporting state, and the pressing protrusion 531 is disposed in the second groove 2242, so that the linkage member 200 is fixed relative to the base frame assembly 100, and can only drive the supporting member 320 to move towards the avoiding state. In addition, under the force of the elastic member 520, a relatively greater turning force is to apply, so that the pressing protrusion 531 is disengaged from the second groove 2242 and enters the bearing surface 2241, so that the flexible display screen 11 of the foldable electronic device 10 can be fixed firmly when the flexible display screen 11 of the foldable electronic device 10 is in the unfolded state, so that the user can conveniently watch contents displayed on the large-screen display and operate the large-screen display.

Specifically, when the supporting member 320 is in the folded state and the unfolded state, the pressing protrusion 531 is disposed in the second groove 2242, so that the linkage member 200 is fixed relative to the base frame assembly 100. In this way, when the folding mechanism 12 is in the folded state, the supporting member 320 is in the avoiding state, and the pressing protrusion 531 is disposed in the second groove 2242, so that the linkage member 200 is fixed relative to the base frame assembly 100, and can only drive the supporting member 320 to move toward the supporting state. In addition, under the force of the elastic member 520, a greater turning force is to apply, so that the pressing protrusion 531 is disengaged from the second groove 2242 and enters the bearing surface 2241, so that the flexible display screen 11 of the foldable electronic device 10 can be fixed firmly when in the folded state, so as to facilitate the user to carry. When the folding mechanism 12 is switched from the folded state to the unfolded state, the user can apply a greater turning force to moves the first housing 13 and the second housing 14 relative to each other. In this process, the pressing protrusion 531 gradually disengages from the second groove 2242 and moves to be on bearing surface 2241. At this time, the pressing protrusion

531 is subjected to the resistance of the elastic member 520, and in the process of move opposite to the bearing surface 2241, rotational damping is also provided. When the pressing protrusion 531 falls into the second groove 2242 again, the folded mechanism is in the unfolded state, the supporting member 320 is in the supporting state, the pressing protrusion 531 is disposed in the second groove 2242, so that the linkage member 200 is fixed relative to the base frame assembly 100, and can only drive the supporting member 320 to move towards the avoiding state. In addition, under the force of the elastic member 520, a greater turning force is to apply, so that the pressing protrusion 531 can be separated from the second groove 2242, and the flexible display screen can be fixed firmly, so that the user can conveniently watch contents displayed on the large-screen display and operate the large-screen display.

It should be noted that the third rotating member 221 and the mating portion 224 may be integrally formed and fixed, or may be separately manufactured and then fixedly connected to each other.

It should be noted that the implementation of the "damping assembly 500" may also be other manners, for example, at least one of using a friction plate to increase the rotational friction of the rotating member; or using the elastic member 520 to increase the rotational resistance of the rotating member; or, using magnetic member to increase rotational resistance of the rotating member or the like.

Figure 15:
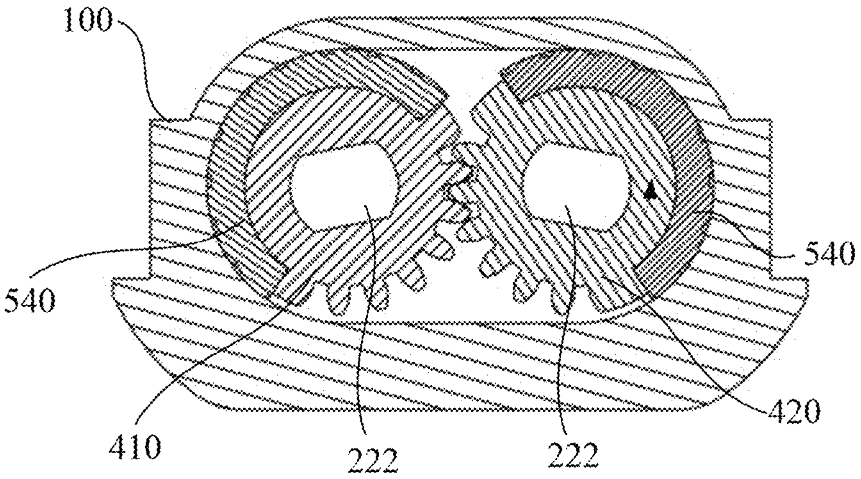
FIG. 15 is a schematic application diagram of a damping assembly and a synchronizing assembly according to another embodiment.

As shown in FIG. 15, in some embodiments, the damping assembly 500 includes damping rings 540 respectively disposed on the third rotating shafts 222, and each damping ring 540 is of a shape of at least part of a ring and frictionally engaged with a part of the base frame assembly 100. In this way, the rotating friction force to the third rotating shaft 222 can be increased by using the damping ring 540, so that the rotational resistance to be overcome by the third rotating shaft 222 can be increased, and thus the third rotating shaft 222 and the housing (the first housing 13 or the second housing 14) connected with the third rotating shaft 222 and the supporting member 320 can be hovered and fixed in a set rotation range, and it is convenient for the user to use.

Optionally, the damping ring 540 is provided with a friction pattern that is in frictional engagement with a part of the base frame assembly 100. In this way, the friction pattern can further increase the rotational friction of the third rotating shaft 222, thereby achieving a better hovering and fixing effect.

A material of the damping ring 540 includes, but is not limited to, rubber, plastic, metal, ceramic or other materials.

Figure 16:
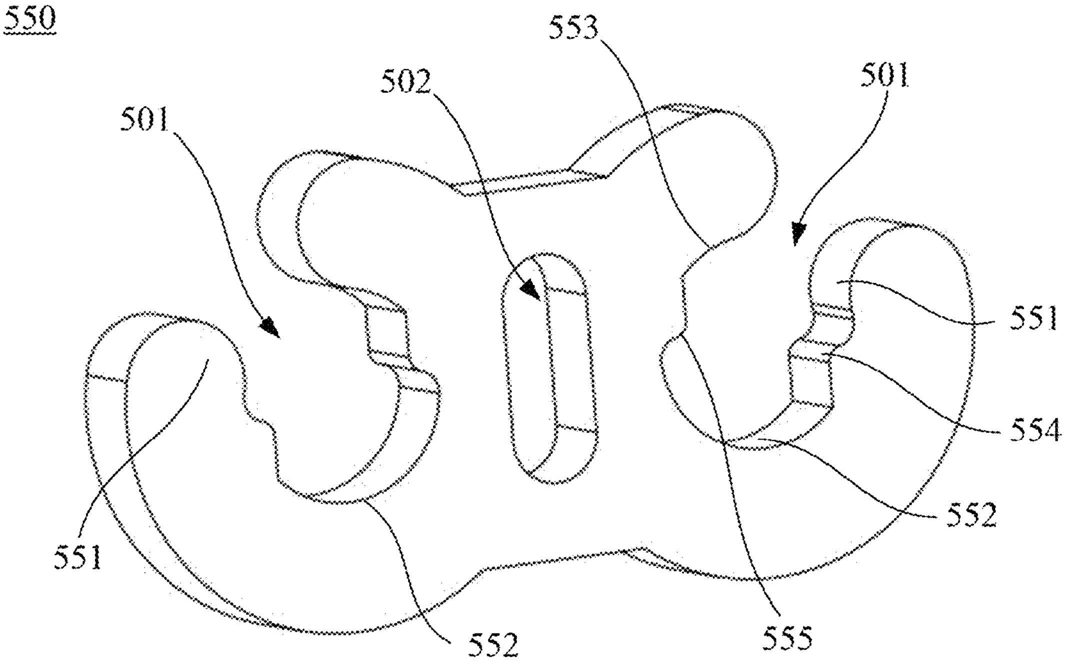
FIG. 16 is a schematic structural diagram of a damping assembly shown according to another embodiment.
Figure 17:
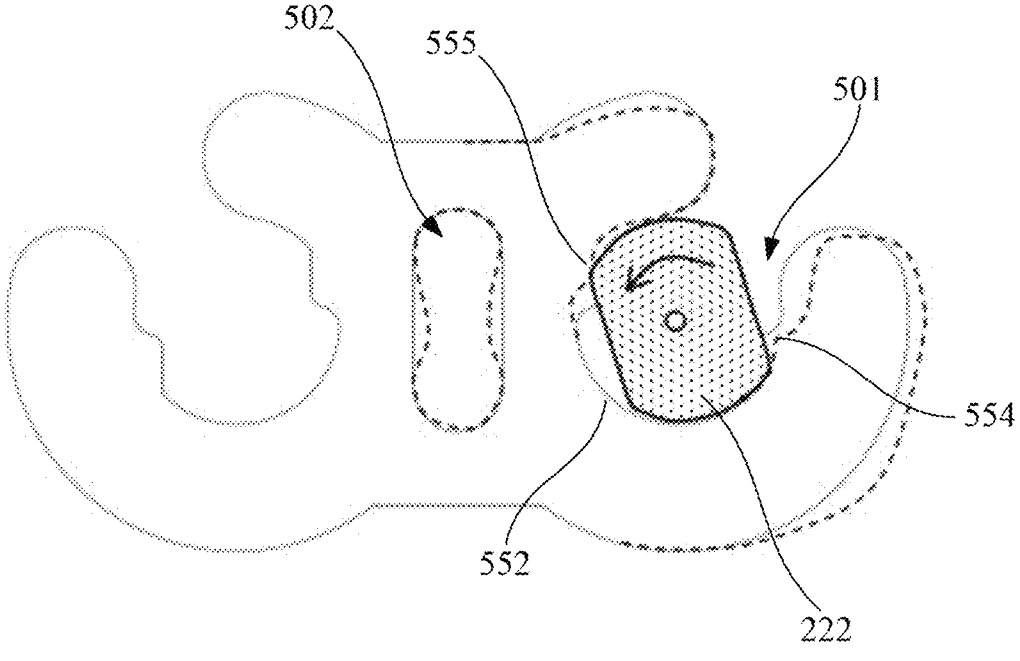
FIG. 17 is a schematic diagram of mating between the damping assembly shown in FIG. 16 and a third rotating shaft.

With reference to any one of the foregoing embodiments, as shown in FIG. 16 and FIG. 17, in some embodiments, the damping assembly 500 further includes a damping member 550. The damping member 550 is fixed in the base frame assembly 100, and the damping member 550 is fastened to and frictionally fitted with the third rotating shaft 222 to at least increase the resistance of the third rotating shaft 222 when rotating from the unfolded state to the folded state. In this way, with the damping member 550 fastened to and fitted with the third rotating shaft 222, the resistance of the third rotating shaft 222 when rotating from the unfolded state to the folded state can be increased, so that the flexible display screen 11 of the foldable electronic device 10 can be locked and fixed when the flexible display screen 11 of the foldable electronic device 10 is in the unfolded state, so that the user can conveniently watch contents displayed on the large-screen display and operate the large-screen display.

Optionally, in some embodiments, the damping member 550 is securely engaged with the third rotating shaft 222, which may increase the resistance that the third rotating shaft 222 is to overcome in the rotating range. In this way, the flexible display screen 11 of the foldable electronic device 10 can hover and lock at any position during the bending process, so as to facilitate the user to bend the flexible display screen 11 according to personal preferences for use.

In an example, as shown in FIG. 16 and FIG. 17, the damping member 550 includes an elastically deformable mating slot 501. An inner wall of the mating slot 501 includes a first mating segment 551, a second mating segment 552, a third mating segment 553, a first protrusion 554 disposed between the first mating segment 551 and the second mating segment 552, and a second protrusion 555 disposed between the second mating segment 552 and the third mating segment 553. The second mating segment 552 is disposed between the first mating segment 551 and the third mating segment 553, and the third rotating shaft 222 is inserted into the mating slot 501. When the third rotating shaft 222 is rotated from the unfolded state to the folded state, the third rotating shaft 222 abuts against the first protrusion 554 and the second protrusion 555 to increase the rotational resistance of the third rotating shaft 222. In this way, the third rotating shaft 222 may be inserted into the mating slot 501, and when the third rotating shaft 222 is rotated from the unfolded state to the folded state, the third rotating shaft 222 abuts against the first protrusion 554 and the second protrusion 555 to increase the rotational resistance of the third rotating shaft 222, so that the flexible display screen 11 of the foldable electronic device 10 may be fixed firmly when the flexible display screen 11 of the foldable electronic device 10 is in the unfolded state, and the user can conveniently watch contents displayed on the large-screen display and operate the large-screen display.

Optionally, in some embodiments, the third rotating shaft 222 is a non-cylindrical column, and the mating slot 501 is matched with the third rotating shaft 222, for example, the third rotating shaft 222 is a flat shaft, and the mating slot 501 is a flat hole. In this way, it is convenient to use the first protrusion 554 and the second protrusion 555 to abut against the third rotating shaft 222 to increase the resistance that the third rotating shaft 222 needs to overcome from the unfolded state to the folded state.

Optionally, the damping member 550 is further provided with a relief hole/clearance hole 502 to adjust the elastic deformation of the damping member 550. Through elastic deformation, the third rotating shaft 222 can be disengaged from the first protrusion 554 and the second protrusion 555, so that the third rotating shaft 222 can enter the folded state.

Based on any one of the above embodiments, in some embodiments, the linkage member 200 and the supporting assembly 300 are respectively in at least two sets, and are respectively disposed on two sides of the base frame assembly 100 in a one-to-one correspondence. The folding mechanism 12 further includes a synchronizing assembly 400, and the linkage members 200 correspondingly disposed on two sides of the base frame assembly 100 are synchronously rotatably connected through the synchronizing assembly 400.

As shown in FIG. 6 and FIG. 15, in some embodiments, the synchronizing assembly 400 includes a first gear 410 and a second gear 420 synchronously rotating with the first gear 410. The first gear 410 rotates synchronously with the third rotating shaft 222 of one set of linkage member 200, and the second gear 420 synchronously rotates with the third rotating shaft 222 of the other set of linkage member 200.

It should be noted that the first gear 410 and the second gear 420 may be directly meshed or indirectly meshed through another transmission gear.

In addition, there may be a plurality of implementation manners of the synchronizing assembly 400, including but not limited to the gear synchronous meshing transmission described above, and other implementation manners of synchronous rotation, such as a pulley mechanism, a sprocket mechanism, and the like.

Based on any one of the foregoing embodiments, as shown in FIG. 5, FIG. 6, FIG. 10, and FIG. 11, in some embodiments, the base frame assembly 100 includes a supporting plate 120 and a cover plate 130. At least one of the supporting plate 120 and the cover plate 130 is provided with a first groove 131. The cover plate 130 is fixedly connected to the supporting plate 120, so that the first groove 131 cooperates to form a first arc-shaped groove 110. The first linkage assembly 210 includes a first guiding portion 2121 that is rotatably engaged with the first arc-shaped groove 110. In this way, by means of engagement of the supporting plate 120 and the cover plate 130, the first guiding portion 2121 is conveniently installed in the first arc-shaped groove 110 and is mated with the first arc-shaped groove 110 in a guided manner, which is beneficial to reducing the assembly cost.

Equivalently, the moving member may also be assembled with two members to form the second arcuate slot.

It should be noted that the "cover plate" may be one part of the module "base frame assembly", that is, the cover plate may be assembled with other components of the "base frame assembly" into one module, and then modular assembly is performed; or the "cover plate" may be relatively independent from other components of the "base frame assembly", and may be separately installed. That is, the cover plate together with other components of the "base frame assembly" forms a whole in the present device.

Equivalently, in the present disclosure, components included in the "assembly", "member" and "mechanism" can also be flexibly combined. That is, the components can be modular produced according to actual needs and undergo modular assembly as an independent module; or assembly can be performed separately to constitute a module in the device. The division of the above components is only an embodiment for convenience of reading, but not a limitation to the scope of protection of the present disclosure. As long as the above components are included and the functions are the same, it should be understood as equivalent to the technical solutions of the present disclosure.

It should be noted that, when one element is considered to be "rotatably connected to" another element, the elements may be in a detachable rotating connection manner, or may be undetachably and rotatably connected, as long as rotation may be achieved, for example, shaft connection, articulation, arc directed connection, etc., which may be implemented in the conventional technology, and details are not described herein again.

In the description of the present disclosure, it should be understood that direction or positional relationship indicted by the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc. are based on the orientation or positional relationship shown in the drawings, and are merely for the purpose of ease of describing the present disclosure and simplifying the description, and are not intended to indicate or imply that the device or element referred to must have a specific orientation, be constructed and operated in a specific orientation, and therefore cannot be understood as a limitation on the present disclosure.

Furthermore, the terms "first," "second," and the like are for descriptive purposes only and are not to be construed as indicating or implying relative importance or implicitly indicating the number of indicated technical features. Thus, features defined by "first," "second," and the like may explicitly or implicitly include at least one of the features. In the description of the present disclosure, the meaning of "a plurality of" is at least two, for example, two, three, etc., unless specifically defined otherwise.

In the present disclosure, unless specified and defined otherwise, the terms "mounted", "connected", "connect", "fixed" and the like should be understood in a broad sense, for example, may be fixedly connected, or may be detachably connected or integral; may be a mechanical connection, or may be an electrical connection; or may be a direct connection, or may be indirectly connected through an intermediate medium, and may be a communication between two elements or an interaction relationship between two elements, unless specifically defined otherwise. For those skilled in the art, the specific meaning of the above terms in the present disclosure may be understood according to specific context.

In the present disclosure, unless expressly stated and defined otherwise, the first feature being above or below the second feature may be that the first feature is in direct contact with the second feature, or the first and second features are in indirect contact through an intermediate medium. Moreover, the first feature being "above", "on", and "over" the second feature may be the first feature directly above or over the second feature, or merely indicate that the first feature level height is higher than the second feature. The first feature "below", "below", and "below" of the second feature may be that the first feature is directly below or below the second feature, or merely represents that the first feature level height is less than the second feature.

It should be noted that when an element is referred to as being "fixed to", "disposed on", "fixedly provided to" or "disposed on" another element, it may be directly on another element or may have an intermediate element. When one element is considered to be "connected" to another element, it may be directly connected to the another element or there may be an intermediate element at the same time.

The technical features of the above embodiments may be combined arbitrarily. To make the description concise, all possible combinations of the technical features in the foregoing embodiments are not described, however, as long as the combination of these technical features does not contradict, it should be considered as the scope described in this specification.

The above embodiments only describe example embodiments of the present disclosure, and should not be understood as a limitation on the scope of the invention. It should be noted that, for those skilled in the art, modifications and improvements may also be made without departing from the inventive concept of the present disclosure, all of which fall within the protection scope of the present disclosure.

The invention claimed is:

1. A folding mechanism, comprising:

a base frame assembly and a supporting assembly; and a linkage member comprising a first linkage assembly and a second linkage assembly, wherein the first linkage assembly is rotatably connected with the base frame assembly; the first linkage assembly is rotatably connected with the supporting assembly; the second linkage assembly is rotatably connected with the base frame assembly; the second linkage assembly is slidably connected with the supporting assembly; and the first linkage assembly and the second linkage assembly are rotatably connected.

2. The folding mechanism according to claim 1, wherein the base frame assembly comprises a first supporting surface, the supporting assembly comprises a moving member and a supporting member, the moving member is rotatably connected with the supporting member, the moving member is rotatably connected with the first linkage assembly, and is slidably connected with the second linkage assembly;

when the folding mechanism is in an unfolded state, the supporting member cooperates with the first supporting surface to form a supporting structure; when the folding mechanism is in a folded state, the supporting member is at an angle with respect to the first supporting surface to form an accommodating space.

3. The folding mechanism according to claim 2, wherein the first linkage assembly comprises:

a transmission member, wherein one end of the transmission member is rotatably connected with the second linkage assembly; and at least two rotating members that are rotatably connected with each other, wherein one of the rotating members is rotatably connected with other end of the transmission member and rotatably connected with the base frame assembly, and another of the rotating members is rotatably connected with the moving member.

4. The folding mechanism according to claim 3, wherein the rotating members comprise a first rotating member and a second rotating member;

one end of the first rotating member is rotatably connected to the base frame assembly, and the second linkage assembly is rotatably connected to the base frame assembly; other end of the first rotating member is rotatably connected to one end of the second rotating member and the other end of the transmission member, and other end of the second rotating member is rotatably connected to the moving member.

5. The folding mechanism according to claim 4, wherein the end of the first rotating member comprises a first guiding portion, the base frame assembly is provided with a first arc-shaped groove, and the first guiding portion is rotatably mated with the first arc-shaped groove.

6. The folding mechanism according to claim 4, wherein the other end of the first rotating member is provided with a first hinge portion, the end of the second rotating member is provided with a second hinge portion, and a part of the second hinge portion is mated in the first hinge portion and is hinged with the first hinge portion.

7. The folding mechanism according to claim 6, wherein the first linkage assembly comprises: a first rotating shaft, wherein the first hinge portion comprises at least two first rotating bodies arranged at intervals, a first gap is formed between every two adjacent first rotating bodies at intervals, and each of the first rotating bodies is provided with a second through hole;

the second hinge portion comprises at least two second rotating bodies arranged at intervals, a second gap is formed between every two adjacent second rotating bodies at intervals, and each of the second rotating bodies is provided with a third through hole, one of the second rotating bodies is inserted into the first gap, one of the first rotating bodies is inserted into the second gap, so that the second through hole is coaxial with the third through hole, and the first rotating shaft penetrates through the second through hole and the third through hole.

8. The folding mechanism according to claim 7, wherein the other end of the transmission member comprises two first rotating portions arranged spaced apart, each of the first rotating portions is provided with a first through hole, the first rotating bodies and the second rotating bodies are arranged between the two first rotating portions, and the first through hole, the second through hole and the third through hole are coaxial, and the first rotating shaft penetrates through the first through hole, the second through hole and the third through hole.

9. The folding mechanism according to claim 4, wherein the first linkage assembly comprises a second rotating shaft, the other end of the second rotating member comprises a third hinge portion, the third hinge portion comprises at least two third rotating bodies arranged at intervals, a third gap is formed between every two adjacent third rotating bodies at intervals, and each of the third rotating bodies is provided with a fourth through hole;

the moving member comprises at least two mounting bodies arranged at intervals, a fourth gap is formed between every two adjacent mounting bodies at intervals, each of the mounting bodies is provided with a rotating groove, one of the mounting bodies is inserted into the third gap, one of the third rotating bodies is inserted into the fourth gap, the fourth through hole is coaxially arranged with the rotating groove, and the second rotating shaft penetrates through the fourth through hole and the rotating groove.

10. The folding mechanism according to claim 3, wherein the other end of the transmission member comprises two first rotating portions arranged spaced apart, and a part of the rotating member is arranged between the two first rotating portions and is rotatably connected with the two first rotating portions; and/or the end of the transmission member is provided with a second rotating portion, and the second rotating portion is hinged with the second linkage assembly.

11. The folding mechanism according to claim 2, wherein the moving member is provided with a first arc-shaped guiding portion, the supporting member is provided with a second arc-shaped guiding portion, and the first arc-shaped guiding portion is guidably connected with the second arc-shaped guiding portion, so that the moving member is rotatably connected with the supporting member.

12. The folding mechanism according to claim 11, wherein one of the first arc-shaped guiding portion and the second arc-shaped guiding portion is provided with a second arc-shaped groove, other one of the first arc-shaped guiding portion and the second arc-shaped guiding portion is provided with a second arc-shaped body, and the second arc-shaped body is guidably mated with the second arc-shaped groove.

13. The folding mechanism according to claim 2, wherein the first linkage assembly at least comprises a second supporting surface, and the supporting member comprises a third supporting surface;

when the folding mechanism is in the unfolded state, the second supporting surface is located on a same plane as the first supporting surface and the third supporting surface, respectively;

the first linkage assembly comprises an abutting surface, and when the folding mechanism is in the folded state, the abutting surface abuts against the supporting member.

14. The folding mechanism according to claim 1, wherein at least one first linkage assembly is respectively arranged on two sides of the base frame assembly, second linkage assemblies are arranged side by side on at least one side of the first linkage assembly, and the first linkage assembly is used for driving the second linkage assemblies located on at least one side of the first linkage assembly and the supporting assembly to move.

15. The folding mechanism according to claim 1, wherein the second linkage assembly comprises a third rotating member, the first linkage assembly comprises a transmission member, the supporting assembly comprises a moving member, the third rotating member is rotatably connected with the base frame assembly and the transmission member, and the third rotating member is slidably connected with the moving member.

16. The folding mechanism according to claim 15, wherein the third rotating member comprises:

a third rotating portion rotatably connected to the base frame assembly;

a second guiding portion, where the moving member is provided with a sliding groove slidably mated with the second guiding portion.

17. The folding mechanism according to claim 16, wherein the third rotating member further comprises a fourth rotating portion, the fourth rotating portion is located between the second guiding portion and the third rotating portion, and the fourth rotating portion is rotatably connected to the transmission member.

18. The folding mechanism according to claim 17, wherein the second linkage assembly comprises a third rotating shaft mounted on the base frame assembly, and the third rotating portion comprises a first rotating hole rotatably mated with the third rotating shaft;

the fourth rotating portion comprises a fourth rotating shaft, and the fourth rotating shaft is rotatably connected with the transmission member.

19. The folding mechanism according to claim 18, wherein the folding mechanism further comprises a synchronizing gear and a damping assembly, the synchronizing gear and the damping assembly are disposed on the third rotating shaft.

20. A foldable electronic device, comprising:

a flexible display screen; and a folding mechanism comprising:

a base frame assembly and a supporting assembly; and a linkage member comprising a first linkage assembly and a second linkage assembly, wherein the first linkage assembly is rotatably connected with the base frame assembly; the first linkage assembly is rotatably connected with the supporting assembly; the second linkage assembly is rotatably connected with the base frame assembly; the second linkage assembly is slidably connected with the supporting assembly; and the first linkage assembly and the second linkage assembly are rotatably connected;

wherein the linkage member and the supporting assembly respectively comprise at least two sets of linkage assemblies and at least two sets of supporting assemblies and the at least two sets of linkage assemblies and the at least two sets of supporting assemblies are respectively disposed on two sides of the base frame assembly in one-to-one correspondence, and at least part of the flexible display screen covers the at least two sets of supporting assemblies.

* * * * *